US012056031B2

(12) United States Patent
Aurongzeb et al.

(10) Patent No.: US 12,056,031 B2
(45) Date of Patent: Aug. 6, 2024

(54) SYSTEM AND METHOD FOR PRO-ACTIVELY LIMITING A CLIENT INFORMATION HANDLING SYSTEM FROM INCREASE IN GREENHOUSE GAS EMISSIONS

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 17/967,044

(22) Filed: Oct. 17, 2022

(65) Prior Publication Data

US 2024/0126668 A1 Apr. 18, 2024

(51) Int. Cl.
*G06F 11/30* (2006.01)
*G06F 11/34* (2006.01)
*G06N 3/02* (2006.01)

(52) U.S. Cl.
CPC ...... *G06F 11/3058* (2013.01); *G06F 11/3409* (2013.01); *G06F 11/3438* (2013.01); *G06N 3/02* (2013.01)

(58) Field of Classification Search
CPC ............ G06Q 30/018; G06F 8/61; G06F 8/65
See application file for complete search history.

(56) References Cited

U.S. PATENT DOCUMENTS 7,694,291 B2   4/2010  Chen
8,595,234 B2  11/2013  Siripurapu
(Continued)

FOREIGN PATENT DOCUMENTS

WO   2011/106160 A2   9/2011

OTHER PUBLICATIONS

C. Herrmann, et al., "Sustainability as Strategic Business Model for Profitable Business," 6 pages, May 2014.
(Continued)

*Primary Examiner* — Raqiul A Choudhury
(74) *Attorney, Agent, or Firm* — Prol Intellectual Property Law, PLLC; H. Kenneth Prol

(57) ABSTRACT

A protective carbon dioxide ($CO_2$) emissions minimization system executing on a unified endpoint management platform information handling system may comprise a network interface device to receive operational telemetry measurements for a client information handling system including a non-eco-friendly state transition threshold value, a neural network modeling a relationship between changes in $CO_2$ emissions values and operational telemetry measurements to predict that a user-adjustable operational telemetry measurement will cause a future determined $CO_2$ emissions value for the client information handling system exceeding the non-eco-friendly state transition threshold value, a hardware processor to identify a remediation user instruction predicted to change operation of the client information handling system, causing a change in the user-adjustable operational telemetry measurement to prevent the future determined $CO_2$ emissions value from exceeding the non-eco-friendly state transition threshold value, and the network interface device to transmit the remediation user instruction to the client information handling system.

20 Claims, 8 Drawing Sheets

(56) References Cited

U.S. PATENT DOCUMENTS

| | | |
|---|---|---|
| 8,626,450 B2 | 1/2014 | Dooley |
| 8,904,374 B2 | 12/2014 | Nakamura |
| 9,760,474 B2 | 9/2017 | Pillai |
| 10,146,286 B2 | 12/2018 | Lee |
| 10,254,808 B2 | 4/2019 | Messick |
| 10,289,184 B2 | 5/2019 | Malik |
| 10,429,921 B2 | 10/2019 | Potlapally |
| 10,705,786 B2 | 7/2020 | Liu |
| 10,803,405 B1 | 10/2020 | Levchuk |
| 10,938,954 B2 | 3/2021 | Lee |
| 10,977,293 B2 | 4/2021 | Cai |
| 11,009,938 B1 | 5/2021 | Law |
| 11,727,345 B1* | 8/2023 | Coughran .............. G06N 20/20 705/338 |
| 2009/0292617 A1 | 11/2009 | Sperling |
| 2010/0070404 A1 | 3/2010 | McConnell |
| 2014/0100937 A1 | 4/2014 | Na |
| 2014/0316964 A1 | 10/2014 | Slutsker |
| 2017/0123857 A1 | 5/2017 | Khan |
| 2019/0349321 A1 | 11/2019 | Cai |
| 2020/0242858 A1* | 7/2020 | Meroux ................. G07C 5/085 |
| 2021/0004328 A1 | 1/2021 | Wang |
| 2021/0373638 A1 | 12/2021 | Schluessler |
| 2022/0229639 A1* | 7/2022 | Malvankar ............ G06F 16/285 |
| 2022/0261685 A1* | 8/2022 | Sabat ..................... G06F 18/25 |
| 2023/0084240 A1* | 3/2023 | Zhang ............... G06V 30/2504 382/157 |
| 2023/0162072 A1* | 5/2023 | Nyamwange ........... G06F 8/436 716/100 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

| User Instructions | Predicted CO₂ emissions state | Hardware component replacement Risk Value | Predicted Hardware life extension | Accept? |
|---|---|---|---|---|
| • Cap GPU resources available to gaming application | State Two | 10% | 100 days | ☒ YES ☐ NO |
| • Install latest version of fan driver | State Two | 30% | 250 days | ☒ YES ☐ NO |
| • Automatically close unused browsing application sessions after four hours<br>• update operating system to latest version | State Two | • 20%<br>• 40%<br>• Total: 60% | • 300 days<br>• 180 days<br>• Total: 480 days | ☐ YES ☒ NO |
| • Cap memory resources available to background applications<br>• Cap GPU resources available to gaming application<br>• Cap network interface device resources available to browsing application<br>• install latest version of fan driver<br>• Automatically close unused browsing application sessions after four hours | State One | • 5%<br>• 10%<br>• 15%<br>• 30%<br>• 20%<br>• Total: 80% | • 50 days<br>• 100 days<br>• 150 days<br>• 250 days<br>• 180 days<br>• Total: 730 days | ☐ YES ☒ NO |

302 / 304 / 306 / 308 / 310

US 12,056,031 B2

SYSTEM AND METHOD FOR PRO-ACTIVELY LIMITING A CLIENT INFORMATION HANDLING SYSTEM FROM INCREASE IN GREENHOUSE GAS EMISSIONS

FIELD OF THE DISCLOSURE

The present disclosure generally relates to determining an amount of greenhouse gas emissions that may be attributable to operation of an information handling system based on age of the device. More specifically, the present disclosure relates to a protective carbon dioxide ($CO_2$) emissions minimization system for pro-actively limiting $CO_2$ emissions due to inefficient operation of a client information handling system due to factors in addition to the age of the device over the entire lifecycle of the client information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical illustration of a graphical user interface (GUI) for presenting recommended remediation user instructions according to an embodiment of the present disclosure;

The use of the same reference symbols in different drawings may indicate similar or identical items.

DETAILED DESCRIPTION OF THE DRAWINGS

Figure 1:
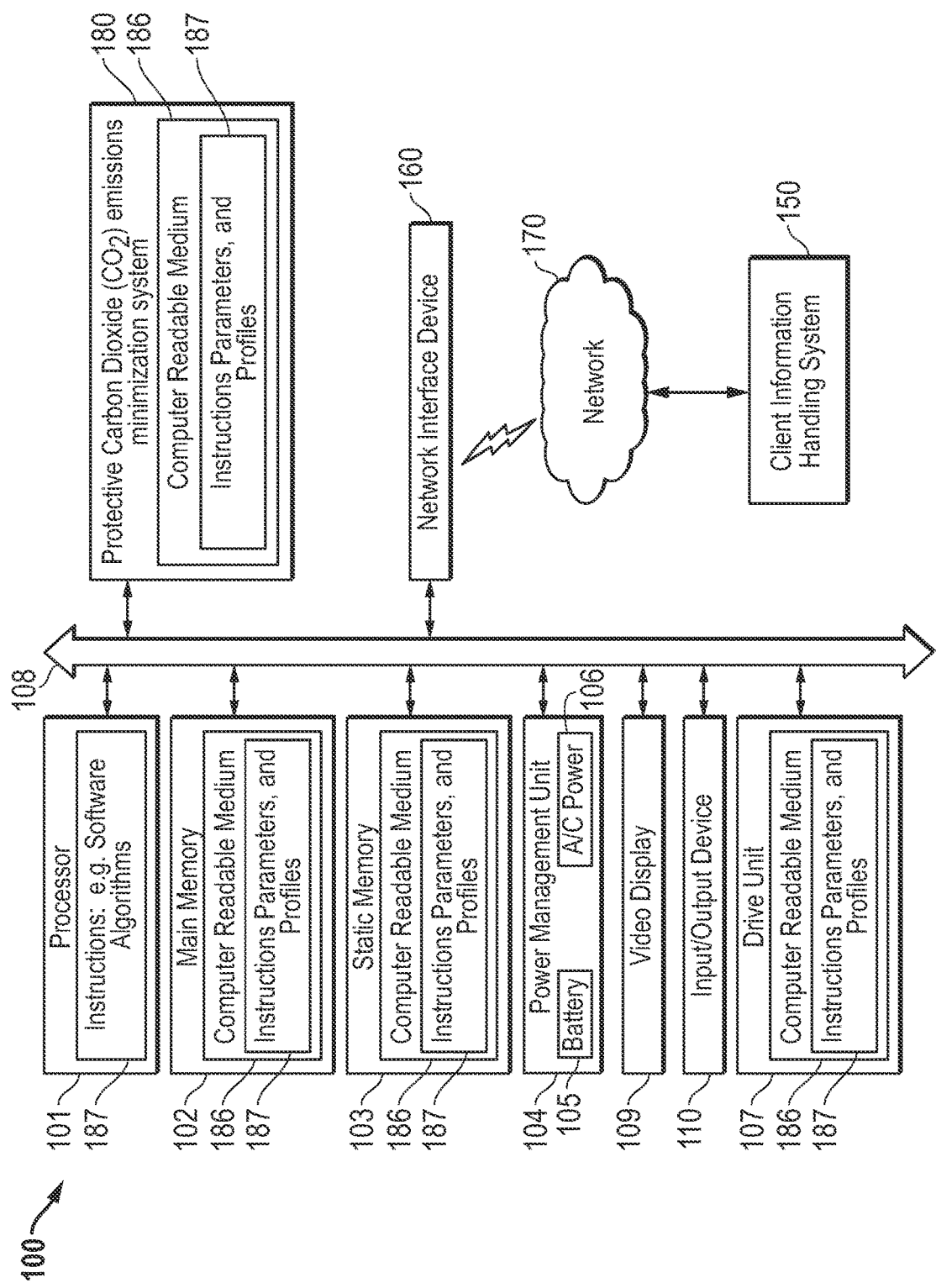
FIG. 1 is a block diagram illustrating a cloud-based Unified Endpoint Management (UEM) platform information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is efficiency of device operation, including software application execution, hardware operation, and power consumption at end devices such as information handling systems operated by an end user. This efficiency measure may decrease when client information handling systems are used inefficiently or poorly maintained by a user (e.g., failure to update software or firmware, constant execution of background applications, high workload, maintaining multiple browsing sessions simultaneously, hardware components set to high performance mode rather than eco-friendly mode). These circumstances may be avoidable through warnings or recommendations provided to the user. However, this efficiency measure may also decrease as the client information handling system ages, due to unavoidable wear and tear on components. Goals may be set for capping $CO_2$ emissions due to operation of each client information handling system that takes the age of the device and its components into account.

In various embodiments described herein, the life cycle of each client information handling system may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be unique to each client information handling system and may take into account the age of each device. For example, the first state may be defined by a maximum value of pounds of CO2 emitted per hour measured during a preset three or six month period following initial operation of the client information handling system. During this first state, it is assumed that the client information handling system is working at peak efficiency. In other words, it is assumed that the client information handling system is not experiencing efficiency loss due to age or due to inefficient use of the device. This first state threshold maximum value of pounds of CO2 emitted per hour may provide a benchmark against which future efficiency of the client information handling system may be measured.

As described above, some decrease in operational efficiency at each client information handling system is unavoidable due to wear and tear of components, such as, for example, the battery. Thus, the CO2 emitted per hour is expected to increase over time, even when the client device is being used as efficiently as possible, due to decreased efficiency of the battery as it ages. In other words, even if the updating and execution of software and firmware and power consumption of various components are optimized for minimizing CO2 emissions, increases in CO2 emissions during operation of the client information handling system will still occur. Such unavoidable increases in CO2 emissions due to aging are differentiated from further increases in CO2 emissions due to avoidable inefficient usage of the client information handling system (e.g., due to failure to perform updates, non-optimized execution of software or firmware, or non-eco-friendly power consumption by hardware components) in embodiments of the present disclosure.

The second state in embodiments of the present disclosure defines a maximum CO2 emissions value for the client information handling system when the device is being used as efficiently as possible, but that also takes into account the age of the client information handling system and its components (e.g., battery). This maximum CO2 emissions value defining the second state in embodiments may be referred to herein as a non-eco-friendly state transition threshold value, before transition to a third-non-eco-friendly state. For example, the non-eco-friendly state transition threshold value in embodiments may be determined by weighting the threshold maximum CO2 emissions value defining the first state (e.g., in which the client information handling system is assumed to be operating at peak efficiency, optimized to minimize CO2 emissions) by a decrease in efficiency of the battery due to age. When operation of the client information handling system causes emission of CO2 beyond this non-eco-friendly state transition threshold value, the client information handling system may pass from the second state to the third, non-eco-friendly state, in which inefficient operation of the device unrelated to age causes increased CO2 emissions. In such a way, the recommendation agent may estimate CO2 emissions for optimally efficient usage of the client information handling system, given the unavoidable drop in efficiency of its battery, when operating in the second state.

In other embodiments of the present disclosure, a cloud-based protective CO2 emissions minimization system may predict when the client information handling system is likely to move from the second state to the third state by increasing CO2 emissions beyond the non-eco-friendly state transition threshold value described above, due to inefficiencies not related to age. The cloud-based protective CO2 emissions minimization system in embodiments may make such a prediction using a neural network modelling a relationship between changes in CO2 emissions values and changes in client device operational telemetry measurements, and in particular, user-adjustable operational telemetry measurements that may be affected by a command to alter function of the client information handling system. In a particular embodiment, this modelled relationship between CO2 emissions and changes in operational telemetry may be conducted with respect to client information handling systems having similar usage profiles or usage purposes for client information handling systems.

The cloud-based protective CO2 emissions minimization system in various embodiments may then use this modeled relationship to identify one or more changes in power measurements, software analytics measurements, or error log events that could cause an individual client information handling system to cross from the second state to the non-eco-friendly third state. For example, the cloud-based protective CO2 emissions minimization system in embodiments may predict that failure of a specifically identified hardware component, increased power consumption by a specific hardware component, high workload by a specific software application, failure to perform a critical update to firmware, or continued uncapped usage of background software applications may cause a future transition from the second state to the third state at a particular client information handling system.

In various embodiments described herein, the protective CO2 emissions minimization system may use the neural network to test whether remediation user instructions associated with such candidate client device operation causes of the predicted transition to the non-eco-friendly CO2 emissions third state may effectively pro-actively limit such a transition. For example, in one embodiment, the protective CO2 emissions minimization system predicts that failure to update a driver for a fan may cause a client information handling system to transition to the non-eco-friendly CO2 emissions state three during the current monitoring period. In such an embodiment, the protective CO2 emissions minimization system may use the trained neural network to determine whether implementing a remediation user instruction to update the fan driver at the client information handling system will likely pro-actively limit the transition to the non-eco-friendly CO2 emissions state three. Such a process may be performed for a plurality of future client device operational causes for the predicted future transition to the non-eco-friendly CO2 emissions state three in order to determine a remediation user instruction or a combination of remediation user instructions that will protect the client information handling system from transitioning to the non-eco-friendly CO2 emissions state three.

FIG. 1 illustrates an information handling system 100 according to several aspects of the present disclosure. As described herein, a cloud-based protective CO2 emissions minimization system 180 may determine recommended remediation user instructions to protect a client information handling system (e.g., 150) is from moving into a predicted non-eco-friendly third state by increasing CO2 emissions beyond the non-eco-friendly state transition threshold value. The non-eco-friendly state transition threshold value may be determined by the recommendation agent at that client information handling system 150 and attributed to inefficiencies not related to age of the client information handling system (e.g., 150) or its various hardware components, in some embodiments herein. Client device operational telemetry measurements, both user-adjustable and other operational telemetry measurements, include power analytics, software application analytics, and event viewer error logs, as well as determined CO2 emissions values and state transition threshold values particular to each client information handling systems (e.g., 150) that may be gathered during routine monitoring periods from a plurality of client information handling systems (e.g., 150) at the UEM platform 100 executing the cloud-based protective CO2 emissions minimization system 180.

Using these crowd-sourced operational telemetry measurements from a plurality of client information handling systems (e.g., 150), and CO2 emissions values, the cloud-based protective CO2 emissions minimization system 180 executing on a hardware processor 101 in embodiments herein may use a crowd-source trained feed-forward neural network modelling a relationship between changes in CO2 emissions values and changes in client device operational telemetry measurements, including user-adjustable operational telemetry measurements. The trained feed-forward neural network of the protective CO2 emissions minimization system 180 is used to identify one or more changes in power measurements, software analytics measurements, or error log events that could cause an individual client information handling system (e.g., 150) to cross from the second state to the non-eco-friendly third state. The cloud-based protective CO2 emissions minimization system 180 operating at the UEM platform 100 in an embodiment may then transmit remediation user instructions for pro-actively limiting the predicted transition to the non-eco-friendly CO2 emissions state three at the client information handling system (e.g., 150).

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the protective CO2 emissions minimization system 180, wireless network interface device 160, a static memory 103 or drive unit 107, a, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the protective CO2 emissions minimization system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing a protective CO2 emissions minimization system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present embodiments encompass software, firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as predicting, based on operational telemetry measurements from a plurality of client information handling systems (e.g., 150), that a client information handling system (e.g., 150) may transition from a CO2 emissions state two which is eco-friendly to a non-eco-friendly CO2 emissions state three during a current monitoring period and providing remediation user instructions for pro-actively limiting such a transition. For example, instructions 187 may include a particular example of a protective CO2 emissions minimization system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The protective CO2 emissions minimization system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the protective CO2 emissions minimization system 180, firmware or software algorithms, processes, and/or methods may be stored here. Such code instructions 187 may comprise predicting and notifying a user when the client information handling system (e.g., 150) is likely to move from the second state to the third non-eco-friendly state by increasing CO2 emissions beyond the non-eco-friendly state transition threshold value due to inefficiencies not related to age of the client information handling system 150. The protective CO2 emissions minimization system 180 may operate on hardware processing resources within a Unified Endpoint Management (UEM) platform 100 that gathers telemetries from a plurality of client information handling systems (e.g., 150) endpoints via the network 170 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the protective CO2 emissions minimization system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may execute software, including firmware embedded at a device, such as an Intel® Core class hardware processor, ARM® brand hardware processors, Qualcomm @Snapdragon hardware processors, or other hardware processors and chipsets, or other such device, or software capable of operating a relevant environment of the information handling system. The system, device, controller, or module may also comprise a combination of the foregoing examples of hardware, firmware, or software. In an embodiment an information handling system 150 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
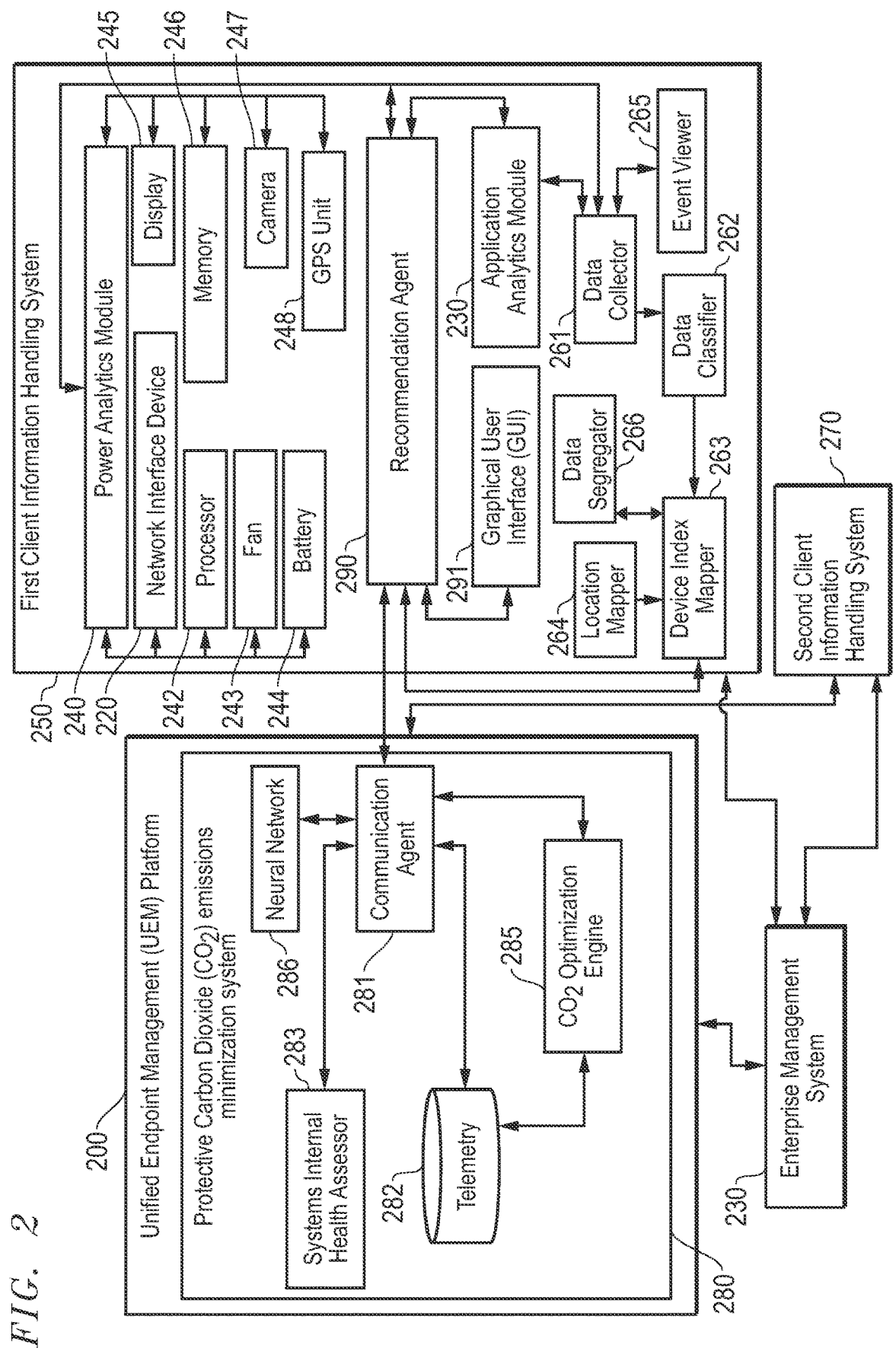
FIG. 2 is a block diagram illustrating a protective carbon dioxide ($CO_2$) emissions minimization system executing on a UEM information handling system with client information handling systems according to an embodiment of the present disclosure.

FIG. 2 is a block diagram illustrating a carbon dioxide (CO2) emissions state transition prediction system 280 for determining remediation user instructions to be implemented at a client information handling system 250 to pro-actively limit a predicted transition to a non-eco-friendly CO2 emissions state three due to inefficient operation of the client information handling system 250 according to an embodiment of the present disclosure. A unified endpoint management (UEM) platform 200 in an embodiment may execute a protective CO2 emissions minimization system 280 to predict an upcoming transition to a non-eco-friendly operational state for one of a plurality of client information handling systems (e.g., 250) under management of or in communication with an enterprise management system 230, which may act as an interface between the client information handling system (e.g., 250 or 270) and the UEM platform 200.

The UEM platform 200 in an embodiment may operate as a cloud-based service in communication with the enterprise management system 230 via a network to identify information technology (IT) issues at a first client information handling system 250, or a second client information handling system 270. The UEM platform 200 and enterprise management system 230 may also provide support for such issues, including automatically updating drivers or hardware components, as needed. In a specific embodiment of the present disclosure, the UEM platform 200 may gather operational telemetry measurements from a plurality of client information handling systems (e.g., 250 and 270) that describe operating environments for those client information handling systems (e.g., power consumption analytics, failures or errors associated with one or more hardware components, or analytics for software usage).

A protective CO2 emissions minimization system 280 in an embodiment may use a crowd-source trained neural network 286 that models a relationship between changes in CO2 emissions values and changes in various operational telemetry measurements, including one or more that may be deemed user-adjustable with adjustments to client information handling system (e.g., 250) operation. For example, client information handling system operational telemetry measurements such as power analytics, software analytics, error log events may be used to predict the degree to which certain changes in operational efficiency of client information handling systems (e.g., 250 or 270) may increase CO2 emitted during such operation. These changes in operational efficiency in an embodiment may be represented by the various operational telemetry measurements as they change, such as changes to power analytics, software application analytics, and event viewer log entries. The UEM platform 200 may receive such operational telemetry measurements upon which such predictions may be made from a plurality of client information handling systems (e.g., 250 and 270), which may be managed by the same enterprise management system (e.g., 230), or may be managed by separate enterprise management systems in various embodiments.

Each client information handling system (e.g., 250 or 270) in an embodiment may include a plurality of hardware components. For example, a first client information handling system 250 in an embodiment may include a network interface device 220, a hardware processor (e.g., central processing unit (CPU), graphics processing unit (GPU), or visual processing unit (VPU)) 242, a display 245, a memory 246, a fan 243, and one or more components of a power supply unit (e.g., battery 244). In some embodiments, the first client information handling system 250 may further include one or more sensing devices, such as a location sensing devices 248 (e.g., GPS location unit), or camera 247, which may also be used during execution of videoconferencing software applications, for example. In another embodiment, the first client information handling system 250 may further be operably connected to one or more peripheral devices, for example. Such an operably connection may employ a driver or firmware for such a peripheral device in such an embodiment. One or more of the other hardware components described herein (e.g., 220, 242, 243, 244, 245, 246, 247, or 248) may further operate according to firmware or driver instructions in an embodiment.

A power analytics module 240 in an embodiment may be in communication with the various hardware components (e.g., 220, 242, 243, 244, 245, 246, 247, or 248) and firmware for those components in an embodiment. For example, the power analytics module 240 may monitor power consumption by each of the various hardware components (e.g., 220, 242, 243, 244, 245, 246, 247, or 248) in an embodiment. In another example embodiment, the power analytics module 240 may also access firmware for hardware components (e.g., 220, 242, 243, 244, 245, 246, 247, or 248) to determine policies or settings for those components at the time of such power measurements. The power analytics module 240, along with the recommendation agent 290 may also receive remediation user instructions to adjust operation of the client information handling system pursuant to the protective CO2 emissions minimization system 280 determining actions to pro-actively limit a client information handling system reaching an unsustainable CO2 generation state (e.g., state three).

More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220. In another example, the power analytics module 240 in an embodiment may determine current usage as a percentage of total capacity for the hardware processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the location sensing device (e.g., GPS unit) 248, peripheral device 249, or camera 247 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN, WWAN, or in RDP, or reset policies for the network interface device 220 to restrict remote calls, operation as a mirror server, power consumption, data rate, or frequencies used. In another example, the power analytics module 240 in an embodiment may adjust the usage mode for the display 245 to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 247 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 242, 243, 244, 245, 246, 247, 248, or 249). In still other embodiments, the power analytics module 240 may further determine power consumed during updates made to various firmware or software applications executing via the hardware processor 242 (e.g., CPU, GPU, or VPU).

As described above, the power analytics module 230 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. In yet another example, the applications analytics module 230 may determine a number of browsing windows engaged in active sessions, and a time of such active engagement. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may cap the percentage of total capacity for the hardware processor 242 or the memory 246 that may be used by specifically identified software applications, or terminate software applications submitting repeated interrupts to the CPU 242 or GPU 246. As another example, the application analytics module 230 in an embodiment may terminate or cap the percentage of total capacity for the hardware processor 242 or memory 246 that may be used by idle or background applications. In yet another example, the application analytics module 230 may cap the amount of time per day that a browsing software application (e.g., Google® Chrome®, Firefox®) maintains active sessions, or capping a number of active windows within such browsing software applications.

As described herein, the data collector module 261 in an embodiment may gather data regarding hardware configuration and power consumption from the power analytics module 240 and data regarding software performance and hardware processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 242, 243, 244, 245, 246, 247, or 248) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., hardware processor error), or a single notification or warning from an analytics module (e.g., failure of a hardware component such as the fan 243). In other cases, a JSON event may include routinely gathered information such as current configurations or policies for various hardware components (e.g., 220, 242, 243, 244, 245, 246, 247, or 248) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1544145450 |
| Client Device ID | 456789 |
| Event ID | 123460 |
| Errors, notifications, warnings | Fan operating at 60 W |
| | Fan workload at 90% |
| | Gaming application initialization Unsuccessful |
| | Gaming application using 90% GPU |
| | Background applications using 90% memory |
| | Browsing application using 90% network interface device resources |
| Location | Paris, France |
| Model | Laptop 7400 |
| Hardware Configuration | WLAN network interface device; |
| | WWAN network interface device; |
| | Bluetooth ® network interface device; |
| | 16 GB memory; |
| | X series CPU; |
| | G Series GPU; |
| | 256 GB Solid State Drive (SSD); |
| | 15.6 inch full high definition (HD) organic light emitting diode (OLED) display; |
| | Fan driver version 14.2; |
| | Webcam Camera type; |
| Hardware Performance | WWAN Interface Device transceived 100 GB; |
| | Battery efficiency 59%; |
| | Display in High Definition Mode; |
| | Motion Detector Set to Continuous Monitor; |
| | Camera in High Resolution Mode; |
| | System used 15 hours per day; |
| | 100 Watts total power consumption per day; |

TABLE 1-continued

| Software | Operating System 10.2; |
| Performance | Browsing application active eight hours per day; |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
  "data" :
  {
    "event_id" : 123460,
    "source_ID" : power_analytics_module,
    "timestamp_unixtime_ms" : 1544145450,
    "custom_flags" :
      {
        "fan_workload" : 0.90,
        "Unsuccessful_initialization_attempt" : gaming_app,
        "gaming_application_GPU_usage" : 0.9,
        "background_application_memory_usage" : 0.9,
        "browsing_application_NID_usage" : 0.9,
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2,
        "efficiency_battery" : 0.59,
        "usage_time_hours_perday" : 15,
        "fan_power_consumption_watts" : 60,
        "total_power_consumption_watts_perday" : 100,
        "active_browsing_hours_perday" : 15;
      }
}
```

The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230. Some JSON events in an embodiment may indicate a hardware failure, such as a JSON event named "WHEA_error," having a value of fan, indicating a failure at the fan. In embodiments where a JSON event indicating a hardware error identifying by the systems internal health assessor (as described below and with respect to FIG. 5 at block 504) appear, the JSON incident may comprise one or more operational telemetry measurements for an information handling system. Upon reformatting of information in an embodiment, the data collector 261 may transmit the JSON incident comprising the operational telemetry measurements to the data classifier 262. In an embodiment, the data classifier 262 may operate to analyze the contents of the JSON incident comprising the operational telemetry measurements, to classify the type of JSON events included therewithin, and to edit the JSON incident to generate a second JSON incident that includes that classification type.

Classification types may be preset according to instructions received by the recommendation agent 290 from the communication agent 281. Such classification types may assist the communication agent 281 and systems internal health assessor 283 in determining when a hardware failure impacting $CO_2$ emissions state for the client information handling system 250 has occurred, or will occur in the immediate future, as described in greater detail below. In example embodiments, classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the protective $CO_2$ emissions minimization system 280 with JSON events titled "fan_workload" having a value exceeding 85%. In another example, an incident classification for "Config," identifying a hardware configuration or policy that may result in various hardware component failures in an embodiment may be associated with JSON events titled "Config," having a value such as "active_browsing_hours_perday" having a value above 10, "server_mirroring" having a value "ON," "remote_desktop_protocol" having a value "ON," "remote_processor_calls" having a value "ALLOW," "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding 50%. In yet another example, an incident classification for "background_usage," identifying relatively intensive usage of software applications operating in idle mode or in the background that may result in various hardware component failures in an embodiment may be associated with JSON events titled "background_usage" having a value exceeding 85%. Any numerical or percentage maximum application usage threshold values preset as described directly above may be set to any number between one and one hundred in various embodiments described herein.

In an example embodiment, the data classifier 262 in an embodiment may analyze the JSON incident comprising operational telemetry measurements described above to identify whether any of the JSON events and values associated with preset incident classifiers appear within the JSON incident. For example, the data classifier 262 in an embodiment may determine the JSON incident comprising operational telemetry measurements described above includes the JSON event named "fan_workload," having a value of 0.90, or 90%, which is greater than the preset maximum fan workload of 85%. In such an embodiment, the data classifier 262 may determine these JSON events are associated with the preset incident classifier "workload," and may append this classification to the end of the JSON incident comprising operational telemetry measurements to generate a classified JSON incident comprising operational telemetry measurements:

{
    "incident_class": Workload,
}

In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config," and append these classifications to the JSON incident to generate a classified JSON incident comprising operational telemetry measurements such as:

}
    "incident_class": Workload,
    "incident_class": Driver_perf,
    "incident_class": Config,
}

The classified JSON incident comprising operational telemetry in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 248. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident comprising operational telemetry measurements to generate an indexed and classified JSON incident comprising operational telemetry measurements that includes this information, such as shown directly below, which is then transmitted to the recommendation agent 290:

{
    "data":
    {
        "event_id" : 123460,
        "source_ID" : power_analytics_module,
        "timestamp_unixtime_ms" : 1544145450,
        "client_device_ID" : 456789,
        "client_device_model" : Laptop_7400,
        "location" : Paris_France,
        "custom_flags" :
        {
            "fan_workload" : 0.90,
            "Unsuccessful_initialization_attempt" : gaming_app,
        }
        "device_current_state :
        {
            "NID_1_type" : WLAN,
            "NID_2_type" : WWAN,
            "NID_2_data_transceived" : 100 GB,
            "NID_3_type" : BT,
            "memory_type" : 16_GB,
            "CPU_type" : X_Series,
            "GPU_type" : G_Series,
            "SSD_type" : 256_GB,
            "Display_type" : 15.6_HD_OLED,
            "fan_driver_version" : 14.2,
            "Display_mode" : high_definition,
            "Camera_type" : webcam,
            "Camera_detection_mode" : continuous_monitor,
            "Camera_capture_mode" : high_resolution,
            "OS_Version" : 10.2,
            "efficiency_battery" : 0.59,
            "usage_time_hours_perday" : 15,
            "fan_power_consumption_watts" : 60,
            "total_power_consumption_watts_perday" : 100,
            "active_browsing_hours_perday" : 15;
        }
    }
    "incident_class" : Workload,
}

The recommendation agent 290 in an embodiment may determine a $CO_2$ emissions value for the client information handling system 250 based on the classified and indexed JSON incident received from the device index mapper 263. This $CO_2$ emissions value determination may be made based on the location of the device, the power consumed by each of the hardware components, the usage time for such power consumption, and the efficiency of the battery, as shown in the indexed and classified JSON incident.

The location of the client information handling system may define an estimated amount of $CO_2$ (in pounds per kWh) emitted during generation of the power consumed by the client information handling system. Carbon footprint for a client information handling system (e.g., 250 or 270) in an embodiment may be based on the power consumed by the client information handling system (e.g., 250 or 270), the duration of such consumption, and a location $CO_2$ emissions rate describing the amount of $CO_2$ or other GHGs emitted during generation of each Watt of power consumed by the client information handling system (e.g., 250 or 270). In embodiments, the recommendation agent 290 may communicate with the $CO_2$ optimization engine 285 or telemetry 282 to determine such a location $CO_2$ emissions rate for the client information handling systems 250 based on the location given within an indexed and classified JSON incident (e.g., as shown directly above) and stored in telemetry 282. For example, the recommendation agent 290 may communicate with the $CO_2$ optimization engine 285 or telemetry 282 to determine the location $CO_2$ emissions rate describing the amount of $CO_2$ of other GHGs emitted during generation of each Watt of power consumed by the client information handling system 250 in Paris, France (e.g., the location of the client information handling system 250 as shown in the indexed and classified JSON incident) to be 0.136 pounds CO2 per kWh.

In an example embodiment when the client information handling system 250 has just been initially operated (and is thus assumed to be operating at peak efficiency), the CO2 emissions value may be determined using the equation below to determine the CO2 emissions value for the client information handling system 250 operating in Paris, France, where the location CO2 emissions rate is 0.136 pounds CO2 per kWh, the power consumed is 100 Watts over a usage time of 15 hours at a battery efficiency of 59% is equivalent to 0.346 pounds CO2 per day:

$$\text{CO2 Emissions Value} = \frac{\text{location CO2 emissions rate} * \text{Power Consumed} * \text{Usage Time}}{\text{Battery Efficiency}}$$

The recommendation agent in an embodiment may perform this determination of CO2 emissions value for each indexed and classified JSON incident it receives from the device index mapper 263 over the CO2 emissions state determination training period. Following such a determination, the recommendation agent 290 may append one or more JSON events indicating the CO2 emissions value within the indexed and classified JSON incident most recently received from the device index mapper 263 and upon which such a determination was made.

As described herein, the recommendation agent 290 executing on hardware processing resources at a client information handling system 250 in an embodiment may set goals for capping CO2 emissions due to operation of the client information handling system 250 that takes the age of the device and its components into account. In an embodiment, the life cycle of each client information handling system (e.g., 250) may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be unique to each client information handling system and may be established to take into account the age of each device. For example, the first state may be defined by a maximum value of pounds of CO2 emitted per hour measured during a preset three or six month period following initial operation of the client information handling system. During this first state, it is assumed that the client information handling system is working at peak efficiency. In other words, it is assumed that the client information handling system is not experiencing efficiency loss due to age or due to inefficient use of the device. For example, in an embodiment in which the recommendation agent uses the indexed and classified JSON incident shown above to determine the maximum recorded CO2 emissions value during the training period, the recommendation agent may define the maximum CO2 emissions value for the training period to be 0.091 pounds CO2 per day. This first state threshold maximum value of pounds of CO2 emitted per hour may provide an initial benchmark against which future efficiency of the client information handling system may be measured.

As described above, some decrease in operational efficiency at each client information handling system is unavoidable due to wear and tear of components, such as, for example, the battery. Thus, the CO2 emitted per hour is expected to increase over time to an adjustable benchmark, even when the client device is being used as efficiently as possible, due to decreased efficiency of the battery as it ages. In other words, even if the updating and execution of software and firmware and power consumption of various components are optimized for minimizing CO2 emissions, increases in CO2 emissions during operation of the client information handling system will still occur. The recommendation agent 290 in embodiments of the present disclosure differentiates such unavoidable increases in CO2 emissions due to aging from further increases in CO2 emissions due to avoidable inefficient usage of the client information handling system (e.g., due to failure to perform updates, non-optimized execution of software or firmware, or non-eco-friendly power consumption by hardware components).

The recommendation agent 290 may determine a minimum allowable battery efficiency prior to prompting replacement of the battery in an embodiment. These values may be used below to define the boundary between CO2 emissions state two and state three. The recommendation agent 290 in an example embodiment may define this minimum allowable battery efficiency at 25%. In such an example embodiment, the recommendation agent 290 anticipates that the battery efficiency may degrade down to 25% before the battery will be replaced.

The recommendation agent 290 in an embodiment may determine a CO2 emissions state three transition threshold value based on the state two transition threshold value and a minimum allowable battery efficiency, as described in greater detail below with respect to FIG. 4. The recommendation agent 290 may determine a minimum allowable battery efficiency prior to prompting replacement of the battery in an embodiment. These values may be used below to define the boundary between CO2 emissions state two and state three. As described herein, some decrease in operational efficiency at each client information handling system (e.g., 250) is unavoidable due to wear and tear of components, such as, for example, the battery 244. Thus, the CO2 emitted per hour is expected to increase over time, even when the client device 250 is being used as efficiently as possible, due to decreased efficiency of the battery 244 as it ages. The CO2 emissions state transition determination system 290 in an embodiment differentiates such unavoidable increases in CO2 emissions due to aging from further increases in CO2 emissions due to avoidable inefficient usage of the client information handling system 250 (e.g., due to failure to perform updates, non-optimized execution of software or firmware, or non-eco-friendly power consumption by hardware components). For example, the recommendation agent 290 in an embodiment may determine a CO2 emissions state three transition threshold value by dividing the CO2 emissions state two transition threshold by the minimum allowable battery efficiency. This maximum CO2 emissions value defining the second state in embodiments may be referred to herein as a non-eco-friendly state transition threshold value. When operation of the client information handling system 250 causes emission of CO2 beyond this non-eco-friendly state transition threshold value, the client information handling system 250 may pass from the second state to the third, non-eco-friendly state in which inefficient operation of the device unrelated to age causes increased CO2 emissions. In such a way, the recommendation agent 290 may estimate CO2 emissions for optimally efficient usage of the client information handling system 250 in state two, given the unavoidable drop in efficiency of its battery.

The recommendation agent 290 may initiate a CO2 emissions state monitoring period following determination of the CO2 emissions states two and three transition threshold values described directly above. During this monitoring period, the recommendation agent 290 may routinely generate CO2 determined monitoring period JSON incidents (similarly to the method used to generate a CO2 determined training period JSON incident described below with respect to FIG. 3) during a routine period of monitoring, and append the determined CO2 emissions value, CO2 emissions state two transition threshold value, and CO2 emissions state three transition threshold value to generate CO2 state monitoring period JSON incidents.

A data segregator 266 of the client information handling system 250 in an example embodiment may determine whether the client information handling system is operating within the CO2 emissions state two and may include a usage profile for the client information handling system 250 within the CO2 state monitoring period JSON incident during each monitoring period described directly above. The data segregator 266 in an embodiment may operate to narrow the number of CO2 state monitoring period JSON incidents transmitted to the protective CO2 emissions minimization system 280 at the Unified Endpoint Management (UEM) platform 200 and to assist the protective CO2 emissions minimization system 280 in sorting CO2 state monitoring period JSON incidents according to usage profiles.

As described herein, execution of code instructions for the protective CO2 emissions minimization system 280 via hardware processing resources in an embodiment may predict when an information handling system (e.g., 250 or 270) that is currently operating in CO2 emissions state two may imminently transition to the CO2 emissions state three (non-eco-friendly state). Because the protective CO2 emissions minimization system 280 in such an embodiment only analyzes future performance of client information handling systems (e.g., 250 or 270) currently operating within the CO2 emissions second state, only CO2 state monitoring period JSON incidents from those information handling systems (e.g., 250 or 270) currently operating in the CO2 emissions second state need be transmitted to the protective CO2 emissions minimization system 280.

As also described herein, in some embodiments, a separate neural network may be trained for each usage profile identified by the data segregator 266 within the CO2 state monitoring period JSON incidents for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage_profile" having a value of "corporate," or any of the other above-described usage profiles or other contemplated usage profiles within the CO2 state monitoring period JSON incident. Any client usage profile categories may be utilized for various client information handling systems monitored by the UEM platform such that those with similar usage profiles may be used as inputs and as a basis for comparison. These CO2 state monitoring period JSON incidents may then be transmitted to the CO2 state transition prediction system 280 of the UEM platform 200.

The CO2 state transition prediction system 280 in an embodiment may operate to predict when a client information handling system (e.g., 250 or 270) may transition from CO2 emissions state two to CO2 emissions state three during an upcoming or current monitoring period. As described herein, a cloud-based protective CO2 emissions minimization system 280 may predict when the client information handling system 250 is likely to move from the second state to the third state by increasing CO2 emissions beyond the non-eco-friendly state transition threshold value, due to inefficiencies not related to age.

The communication agent 281 operating at the UEM platform 200 in an embodiment may receive and store in telemetry CO2 state monitoring period JSON incidents from a plurality of client information handling systems (e.g., 250 and 270) over a plurality of monitoring periods. In some embodiments, a systems internal health assessor (SIHA) 283 operating at the Unified Endpoint Management (UEM) platform 200 may identify one or more CO2 state monitoring period JSON incidents indicating hardware failure. For example, the SIHA 283 operating at the UEM platform 200 in an embodiment may identify one or more CO2 state monitoring period JSON incidents received from the client information handling system (e.g., 250 or 270) indicating hardware failure at those devices.

The protective CO2 emissions minimization system in an embodiment may use one or more neural networks trained to model relationships between changes in CO2 emissions values over a most recent monitoring period and changes in telemetry measurements in CO2 state monitoring period JSON incidents received from a plurality of client devices over the monitoring period immediately preceding the most recent monitoring period. The protective CO2 emissions minimization system in an embodiment may receive and input into the crowd-source trained neural network a CO2 state monitoring period JSON incident from a first client information handling system in order to predict the CO2 emissions state in which the first client information handling system 250 will operate during the current monitoring period. The execution of code instructions of the protective CO2 emissions minimization system in an embodiment may be used to determine whether the output from the neural network indicates a transition from state two to the non-eco-friendly state three based on the input of the CO2 state monitoring period JSON incident. If the neural network output indicates such a CO2 emissions state transition, this may indicate a high likelihood that the client information handling system 250 will transition from state two to state three within the current monitoring period. In such an embodiment, the code instructions of the protective CO2 emissions minimization system executing on hardware processing resources of the UEM platform in an embodiment may identify one or more candidate client device operation causes for such a prediction. This identification may include identifying a plurality of remediation user instructions for adjusting operation of the client information handling system 250 resulting in various values of user-adjustable operational telemetry measurements identified within the received CO2 state monitoring period JSON incident that may pro-actively limit the transition to the non-eco-friendly state that has been predicted. For example, in an embodiment in which the CO2 state monitoring period JSON incident identifies a specific version of a driver for the fan, the protective CO2 emissions minimization system 280 may identify failure to update the fan driver as a candidate client device operation cause for the predicted transition. Other example candidate client device operation causes are described in greater detail below with respect to FIG. 5.

The protective CO2 emissions minimization system 280 in an embodiment may identify one or more remediation user instructions for pro-actively limiting the candidate client device operation causes so identified and may use the neural network to predict whether those remediation user instructions may effectively pro-actively limit the predicted transition to the non-eco-friendly CO2 emissions state three, as described in greater detail below with respect to FIG. 6. In an embodiment, the protective CO2 emissions minimization system 280 may transmit such remediation user instruction recommendations to the recommendation agent 290 for display to the user via the GUI 291 at client information handling system 250. The user may then select whether to accept or reject such recommendations via the GUI 291. User recommendations that are accepted by the user via the GUI 291 may be implemented at the client information handling system 250. For example, as described in greater detail with respect to FIG. 8, the recommendation agent 290 may coordinate with the power analytics module 240 and software application analytics module 230 to execute a remediation user instruction accepted by a user. More specifically, the user in an embodiment may have accepted a recommendation which provides a remediation user instruction to cap GPU resources made available to the gaming application at 85% (e.g., as indicated by the JSON event named "gaming_application_GPU_usage," having a value of 0.85). In such an embodiment, the software application analytics module 230 may execute such an instruction to cap the GPU resources made available to the gaming application at 85%. By decreasing the amount of GPU resources made available to the gaming application in such a way, the user of the client information handling system 250 may effectively pro-actively limit the predicted transition to the non-eco-friendly CO2 emissions state three during the current monitoring period, as predicted by the protective CO2 emissions minimization system 280 in an embodiment. In such a way, the cloud-based protective CO2 emissions minimization system may recommend remediation user instructions for pro-actively limiting a predicted transition at the client information handling system 250 to the non-eco-friendly third state.

FIG. 3 is a graphical illustration of a graphical user interface (GUI) 300 for presenting recommended remediation user instructions 302 for pro-actively limiting increases in CO2 emissions at a client information handling system above a non-eco-friendly CO2 emissions state (e.g., state three) according to an embodiment of the present disclosure. The GUI 300 at the client information handling system in an embodiment may display remediation user instruction(s) 302 for returning an information handling system to state two or below 304, an identification of a predicted CO2 emissions state 304, a hardware component replacement risk value 306, or a predicted hardware component life extension period 308. For example, the GUI 300 may display a plurality of recommendations 302 received from the protective CO2 emissions minimization system in an embodiment within a GUI table 300. Each row of the table may list details related to each of the remediation user instructions 302 of the first column included within a single recommendation JSON incident received from the protective CO2 emissions minimization system in an embodiment. For example, in an embodiment described in greater detail with respect to FIGS. 6 and 8, the first row of the table 300 may provide the remediation user instruction 302 to cap GPU resources made available to the gaming application, the prediction 304 that such a remediation user instruction 302 will return the client information handling system to state two or pro-actively limit transition to the non-eco-friendly state three, a predicted 10% chance 306 that the remediation user instruction will pro-actively limit replacement of the fan predicted to fail, and a prediction 308 that implementing the remediation user instruction will extend the life of the fan by 100 days. As another example, in an embodiment described in greater detail with respect to FIGS. 6 and 8, the second row of the table 300 may provide the remediation user instruction 302 to install the latest version of the fan driver, the prediction 304 that such a remediation user instruction 302 will return the client information handling system to state two or pro-actively limit transition to the non-eco-friendly state three, a predicted 30% chance 306 that the remediation user instruction will pro-actively limit replacement of the fan predicted to fail, and a prediction 308 that implementing the remediation user instruction will extend the life of the fan by 250 days.

In some cases, a single recommendation JSON incident, and thus a single row of the table 300 may include multiple recommended remediation user instructions 302. For example, in an embodiment described in greater detail with respect to FIGS. 6 and 8, the third row of the table 300 may provide the remediation user instruction 302 to cap the number of active browsing hours per day and a remediation user instruction 302 to update the operating system to the latest version. The third row in such an embodiment may also include the prediction 304 that execution of both of such remediation user instructions 302 will return the client information handling system to state two or pro-actively limit transition to the non-eco-friendly state three, a predicted 60% chance 306 that implementation of both remediation user instructions will pro-actively limit replacement of the fan predicted to fail, and a prediction 308 that implementing both remediation user instructions will extend the life of the fan by 480 days.

Figure 6:
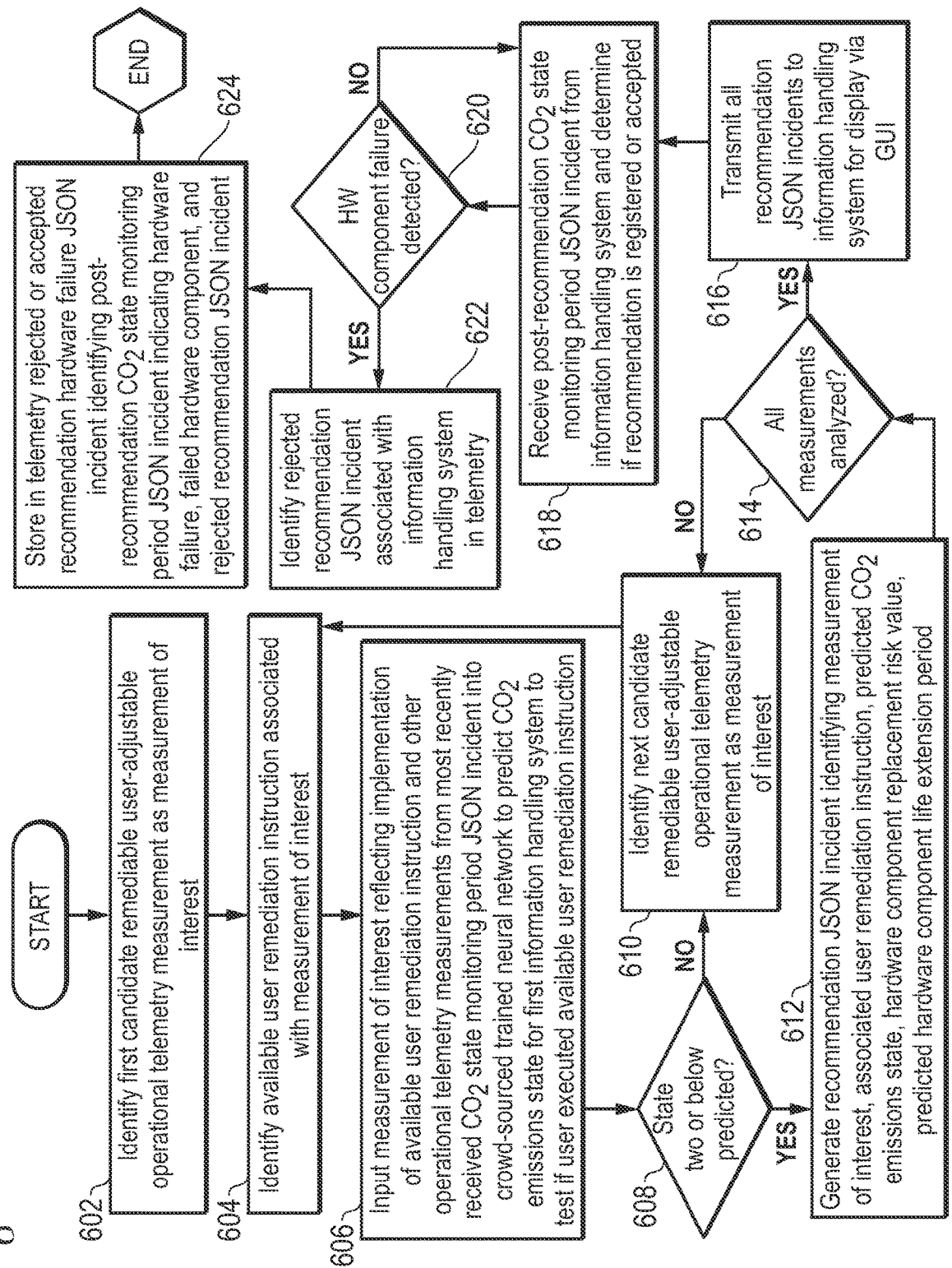
FIG. 6 is a flow diagram illustrating a method of transmitting recommended remediation user instructions according to an embodiment of the present disclosure.
Figure 8:
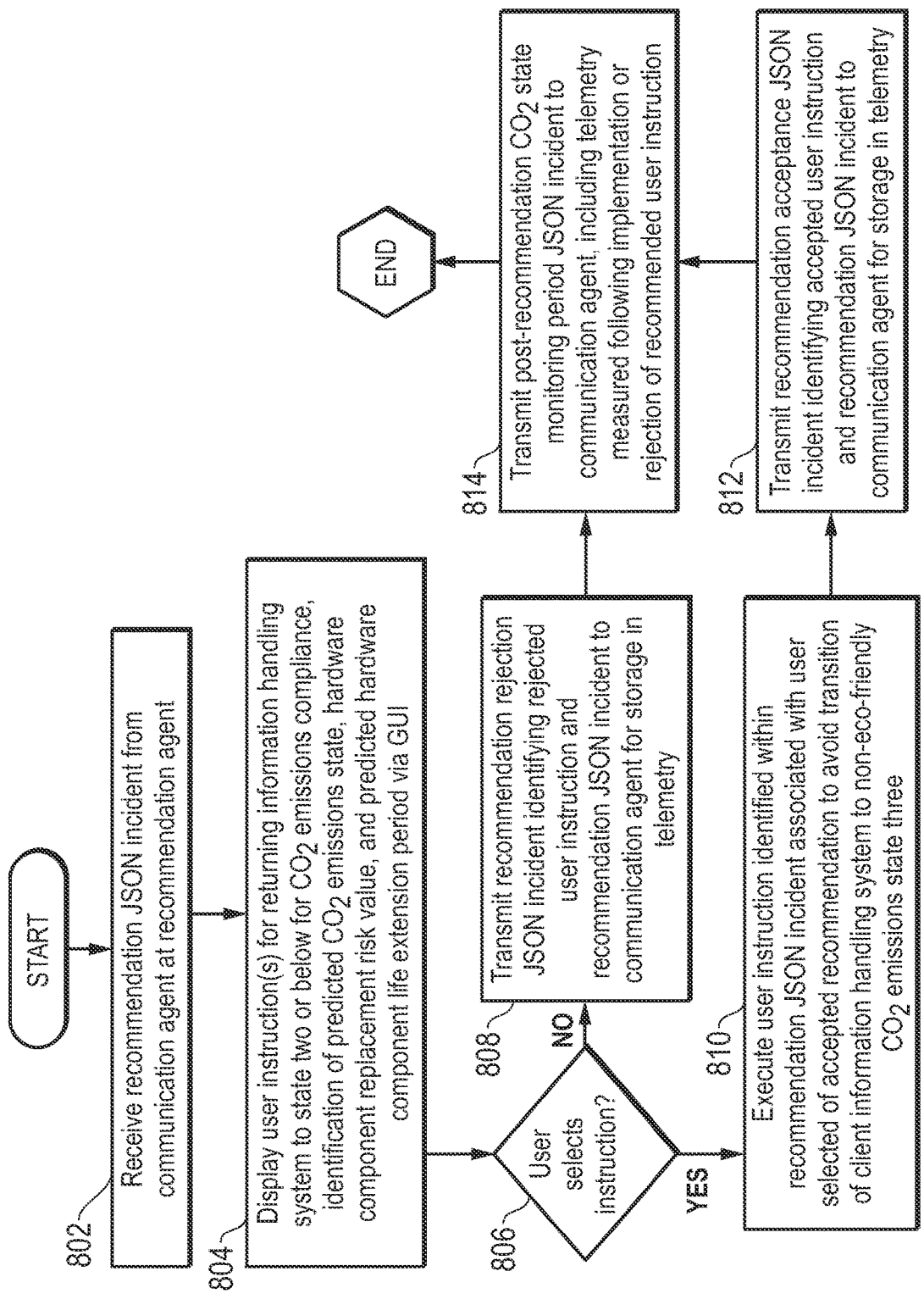
FIG. 8 is a flow diagram illustrating a method of tracking user acceptance or rejection of recommendations according to an embodiment of the present disclosure.

As another example, in an embodiment described in greater detail with respect to FIGS. 6 and 8, the fourth row of the table 300 may provide the remediation user instructions 302 to cap the GPU resources made available to the gaming application, cap the memory resources made available to background applications, cap the network interface device resources made available to the browsing application, install the latest version of the fan driver, and capping the number of active browsing hours per day. The fourth row in such an embodiment may also include the prediction 304 that execution of all such remediation user instructions 302 will return the client information handling system to state one, a predicted 80% chance 306 that implementation of all remediation user instructions 302 will pro-actively limit replacement of the fan predicted to fail, and a prediction 308 that implementing both remediation user instructions will extend the life of the fan by 730 days.

The GUI 300 may further include a user selection of acceptance or rejection 310 of the remediation user instructions 302 displayed in each row in an embodiment. With GUI 300, a user can accept or reject any single or any combination of remediation user instructions 302. In one embodiment, a non-selection may default as a rejection. While a table GUI 300 is shown in the example embodiment of FIG. 3, any GUI format may be used to present remediation user instructions to a user at a client information handling system in various embodiments.

Figure 4:
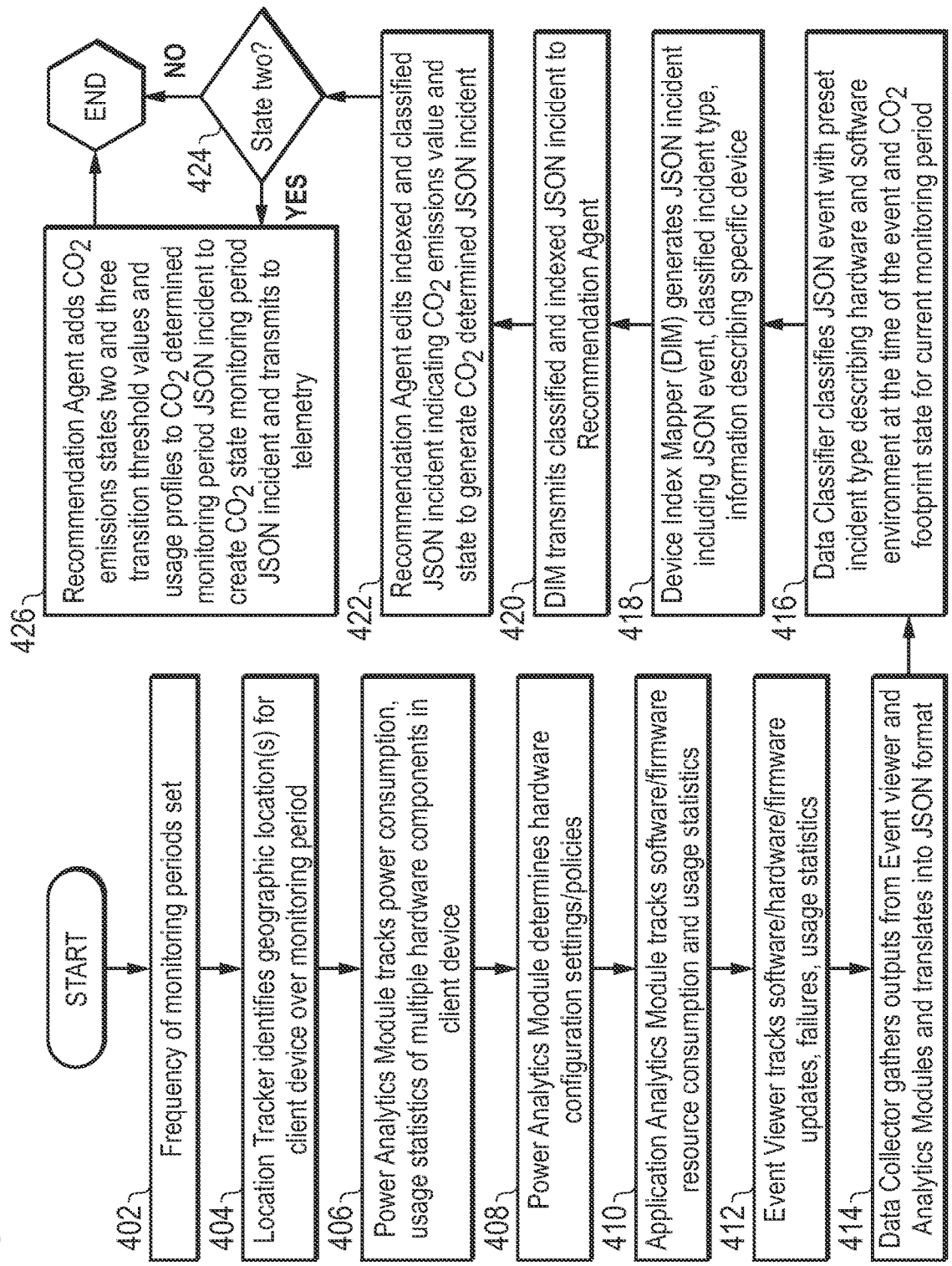
FIG. 4 is a flow diagram illustrating a method of gathering power and application analytics for predicting a candidate client device operation cause of avoidable increase in $CO_2$ emissions according to an embodiment of the present disclosure.

FIG. 4 is a flow diagram illustrating a method of gathering power and application analytics for predicting an avoidable increase in CO2 emissions for an information handling system according to an embodiment of the present disclosure. As described herein, a recommendation agent in various embodiments may determine a first, optimal efficiency CO2 emissions state, a second monitoring period CO2 emissions state, and a third non-eco-friendly CO2 emissions state for an information handling system based on gathered operational telemetry measurements for the information handling system over a training period. As also described herein, a protective CO2 emissions minimization system in various embodiments may use a neural network trained on crowd-sourced operational telemetry measurements from a plurality of client information handling systems to model a relationship between operational telemetry measurements and CO2 emissions states. FIG. 4 describes the method of gathering these operational telemetry measurements from a plurality of client information handling systems in the form of JSON incidents in an example embodiment.

At block 402, a user of the client information handling system or IT professional within an enterprise management system in an embodiment may set a monitoring period for monitoring CO2 emissions states at the information handling system. For example, in an embodiment described with reference to FIG. 2, the data collector 261 in an embodiment may gather data regarding hardware configuration and power consumption from the power analytics module 240 and data regarding software performance and hardware processor usage from the application analytics module 230 at preset intervals. For example, such a preset interval may be set to a default monitoring period value (e.g., one hour, one day, one week, one month, or other), or may be set by the user of the first client information handling system 200 via the graphical user interface (GUI) 290.

A location tracking in an embodiment may identify a geographic location for the client information handling system over the user-specified monitoring period at block 404. For example, the location sensing unit 248 in an embodiment may determine a geographic location (e.g., zip code, GPS coordinates, city, state, country) in which the first client information handling system 250 is operating.

At block 406, the power analytics module may track power consumption of multiple hardware components in the client information handling system in an embodiment. For example, the power analytics module 240 in an embodiment may monitor power consumption by each of the various hardware components (e.g., 220, 242, 243, 244, 245, 246, 247, 248, or 249) in an embodiment. In some embodiments, such hardware power consumption may be attributed to specific software applications. For example, the power analytics module 240 in an embodiment may determine current usage of hardware processing resources by software applications as a percentage of total capacity for the hardware processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245, such as day mode, night mode, power reserve mode, or gaming mode (e.g., high-resolution). In another example, the power analytics module 240 in an embodiment may determine current usage of network interface device resources by software applications as a percentage of total capacity for the network interface device 220 to transceive data (e.g., percentage of total available throughput used). All information accessed in such a way by the power analytics module 240 in an embodiment may be communicated to the data collector 261.

The power analytics module in an embodiment may determine hardware configurations, settings, or policies at block 408. For example, the power analytics module 240 may access firmware for hardware components (e.g., 220, 242, 243, 244, 245, 246, 247, 248, or 249) to determine policies or settings for those components at the time of power measurements made at block 406. More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220. In another example, the power analytics module 240 in an embodiment may determine current usage of hardware processing resources by software applications as a percentage of total capacity for the hardware processor 242 (e.g., central processing unit (CPU), graphics processing unit (GPU), or visual processing unit (VPU)). In yet another example, the power analytics module 240 in an embodiment may determine a current usage mode for the display 245, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the peripheral device 249, location sensing device (e.g., GPS unit) 248, or camera 247 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

At block 410, a hardware processor executing the application analytics module may track software or firmware updates in an embodiment. For example, in an embodiment, the application analytics module 230 may monitor execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed. All information accessed in such a way by the application analytics module 230 in an embodiment may be communicated to the data collector 261.

The event viewer may track failed attempts at firmware or software updates in an embodiment at block 412. For example, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error, a failed attempt at firmware or software updating, or an unusually high consumption of power by hardware components, or identifying the driver or software application associated with a failed update. Such WHEA events may be associated with data packets that specifically identify the hardware component (e.g., 220, 242, 243, 244, 245, 246, 247, 248, or 249) producing the error or consuming the unusually high power levels.

At block 414, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the hardware processor executing code instructions of the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the protective CO2 emissions minimization system 280. For example, the data collector 261 may generate the following JSON incident based on the information gathered and stored in Table 1, above:

```
{
  "data" :
  {
    "event_id" : 123460,
    "source_ID" : power_analytics_module,
    "timestamp_unixtime_ms" : 1544145450,
    "client_device_ID" : 456789,
    "client_device_model" : Laptop_7400,
    "location" : Paris_France,
    "custom_flags" :
      {
        "fan_workload" : 0.90,
        "Unsuccessful_initialization_attempt" : gaming_app,
      }
  "device_current_state :
    {
```

-continued

```
    "NID_1_type" : WLAN,
    "NID_2_type" : WWAN,
    "NID_2_data_transceived" : 100 GB,
    "NID_3_type" : BT,
    "memory_type" : 16_GB,
    "CPU_type" : X_Series,
    "GPU_type" : G_Series,
    "SSD_type" : 256_GB,
    "Display_type" : 15.6_HD_OLED,
    "fan_driver_version" : 14.2,
    "Display_mode" : high_definition,
    "Camera_type" : webcam,
    "Camera_detection_mode" : continuous_monitor,
    "Camera_capture_mode" : high_resolution,
    "OS_Version" : 10.2,
    "efficiency_battery" : 0.59,
    "usage_time_hours_perday" : 15,
    "fan_power_consumption_watts" : 60,
    "total_power_consumption_watts_perday" : 100,
    "active_browsing_hours_perday" : 15;
    }
}
```

The data classifier in an embodiment may classify objects within the gathered JSON event with preset incident types describing heat measurements, hardware component failures, or software application execution and usage for the client information handling system at the time of the event at block 416. For example, the data classifier 262 in an embodiment may edit the JSON incident created at block 414 by adding an incident classifier. More specifically, the data classifier 262 in an embodiment may analyze the JSON incident comprising operational telemetry measurements generated at block 414 to identify whether any of the JSON events and values associated with preset incident classifiers appear within the JSON incident.

For example, the hardware processor executing the data classifier 262 in an embodiment may determine the JSON incident comprising operational telemetry measurements described above includes the JSON event named "fan_workload," having a value of 0.90, or 90%, which is greater than the preset maximum fan workload of 85%. In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config," and append these classifications to the JSON incident to generate a classified JSON incident comprising operational telemetry measurements such as:

```
  }
  "incident_class": Workload,
  "incident_class": Driver_perf,
  "incident_class": Config,
}
```

The hardware processor may execute code instructions of the device index mapper in an embodiment to generate a classified and indexed JSON incident including one or more JSON events and classified incident types at block 418. For example, the device index mapper (DIM) 263 in an embodiment may associate the classified JSON incident comprising operational telemetry measurements with a device ID and device model for the first client information handling system 200. Such a device ID in an embodiment may be one of several device IDs for a plurality of information handling systems (e.g., including the first and second client information handling systems 250 and 270) stored at the protective CO2 emissions minimization system 280. The device index mapper 263 in an embodiment may then edit the classified JSON incident comprising operational telemetry measurements to generate an indexed and classified JSON incident that includes this information:

```
{
  "data" :
  {
    "event_id" : 123460,
    "source_ID" : power_analytics_module,
    "timestamp_unixtime_ms" : 1544145450,
    "client_device_ID" : 456789,
    "client_device_model" : Laptop_7400,
    "location" : Paris_France,
    "custom_flags" :
    {
      "fan_workload" : 0.90,
      "Unsuccessful_initialization_attempt" : gaming_app,
    }
    "device_current_state :
    {
      "NID_1_type" : WLAN,
      "NID_2_type" : WWAN,
      "NID_2_data_transceived" : 100 GB,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version" : 14.2,
      "Display_mode" : high_definition,
      "Camera_type" : webcam,
      "Camera_detection mode" : continuous_monitor,
      "Camera_capture_mode" : high_resolution,
      "OS_Version" : 10.2,
      "efficiency_battery" : 0.59,
      "usage_time_hours_perday" : 15,
      "fan_power_consumption_watts" : 60,
      "total_power_consumption_watts_perday" : 100,
      "active_browsing_hours_perday" : 15;
    }
  }
  "incident_class" : Workload,
}
```

At block 420, the device index mapper may transmit the JSON incident generated at block 418 to the recommendation agent of the client information handling system in an embodiment. As described herein, the recommendation agent 290 in an embodiment may determine an amount of CO2 emitted due to operation of the client information handling system 250 and define three CO2 emissions states in which the client information handling system 250 may operate during its life cycle. These states may include a first, optimal emissions state, a second monitoring period state, and a third, non-eco-friendly state.

The recommendation agent in an embodiment may edit the indexed and classified JSON incident to include a CO2 emissions value and CO2 emissions state for the client information handling system at block 422. The recommendation agent 290 in an embodiment may first determine a CO2 emissions value for the client information handling system 250 based on the classified and indexed JSON incident received from the device index mapper 263. This CO2 emissions value determination may be made based on the location of the device, the power consumed by each of the hardware components, the usage time for such power consumption, and the efficiency of the battery, as shown in the indexed and classified JSON incident.

The location of the client information handling system may define an estimated amount of CO2 (in pounds per kWh) emitted during generation of the power consumed by the client information handling system. Carbon footprint for a client information handling system (e.g., 250 or 270) in an embodiment may be based on the measured power consumed by the client information handling system (e.g., 250 or 270), the duration of such consumption, and a location CO2 emissions rate describing the amount of CO2 or other GHGs emitted during generation of each Watt of power consumed by the client information handling system (e.g., 250 or 270). In embodiments, the recommendation agent 290 may communicate with the CO2 optimization engine 285 or telemetry 282 to determine such a location CO2 emissions rate for the client information handling systems 250 based on the location given within an indexed and classified JSON incident (e.g., as shown directly above) and stored in telemetry 282. For example, the recommendation agent 290 may communicate with the CO2 optimization engine 285 or telemetry 282 to determine the location CO2 emissions rate describing the amount of CO2 of other GHGs emitted during generation of each Watt of power consumed by the client information handling system 250 in Paris, France (e.g., the location of the client information handling system 250 as shown in the indexed and classified JSON incident) to be 0.136 pounds CO2 per kWh.

In an example embodiment, the CO2 emissions value may be determined using the equation below to determine the CO2 emissions value for the client information handling system 250 operating in Paris, France, where the location CO2 emissions rate is 0.136 pounds CO2 per kWh, the power consumed is 100 Watts over a usage time of 15 hours at a battery efficiency of 59% is equivalent to 0.35 pounds CO2 per day:

$$\text{CO2 Emissions Value} = \frac{\text{location CO2 emissions rate} * \text{Power Consumed} * \text{Usage Time}}{\text{Battery Efficiency}}$$

The recommendation agent 290 in an embodiment may perform this determination of CO2 emissions value for each indexed and classified JSON incident it receives from the device index mapper 263 over the CO2 emissions state determination training period. Following such a determination, the recommendation agent 290 may append one or more JSON events indicating the CO2 emissions value within the indexed and classified JSON incident most recently received from the device index mapper 263 and upon which such a determination was made.

The recommendation agent 290 may also define a CO2 emissions state two threshold value, where CO2 emissions values falling below this CO2 emissions state two threshold value fall within an optimal CO2 emissions state one. The hardware processor may execute code instructions of a recommendation agent to routinely gather indexed and classified JSON incidents from the device index mapper 263 during a training period occurring upon initial purchase of the client information handling system 250 or initial usage, in which the client information handling system 250 is assumed to be operating at optimal efficiency with respect to CO2 emissions. Following this training period, which may have a duration set by the manufacturer or IT manager of the enterprise management system 230, the recommendation agent 290 may determine, for each indexed and classified JSON incident, an amount of CO2 emitted due to power consumed by the client information handling system 250.

The maximum determined CO2 emissions value across all JSON incidents during the training period may form the basis for the CO2 emissions state two transition threshold value. For example, the recommendation agent 290 in an embodiment may determine the CO2 emissions value using the equation used above and an indexed and classified JSON incident identifying a total amount of power consumed by all hardware components of the client information handling system 250. More specifically, in an example embodiment, the CO2 emissions value for the client information handling system 250 operating in Paris, France, where the location CO2 emissions rate is 0.136 pounds CO2 per kWh, during the training period immediately following purchase of the client information handling system 250 or its initial use may be equivalent to 0.091 pounds CO2 per day. This may be the case, for example, where the power consumed during one day of the training period is 84 Watts over a usage time of 8 hours at a battery efficiency of 100%. In an embodiment in which this determined CO2 emissions value is the highest CO2 emissions value determined based on JSON incidents gathered during the training period, the recommendation agent 290 may define the CO2 emissions state two transition threshold value to be 0.091 pounds CO2 per day.

The recommendation agent 290 in an embodiment may also determine the three CO2 emissions states in which the client information handling system 250 may operate during its life cycle based on the indexed and classified JSON incident received from device index manager 263. As described herein, the life cycle of each client information handling system (e.g., 250) may be divided into three states. These states include a first, peak-health training state, immediately following initial purchase and use of the device, a monitoring second state in which the client information handling system consistently meets the goal for capping CO2 emissions, and a non-eco-friendly third state in which inefficient operation of the device unrelated to age causes the client information handling system to fail to meet that goal. Each of the threshold CO2 emissions values defining these states may be particular to each client information handling system and its typical usage profile and may take into account the age of each device. The recommendation agent may define each of these states based on a plurality of CO2 determined JSON incidents gathered during the training session.

All indexed and classified JSON incidents gathered during the training period may be grouped into state one, due to the assumption that the client information handling system is operating at peak efficiency with respect to CO2 emissions during this training period. For example, and as described directly above, the CO2 emissions state two transition threshold value may be set to 0.091 pounds CO2 per day. The recommendation agent in an embodiment may determine the CO2 emissions state three transition threshold value based on the state two transition threshold value and a minimum allowable battery efficiency, prior to prompting replacement of the battery. The recommendation agent 290 in an example embodiment may define this minimum allowable battery efficiency at 25%. In such an example embodiment, the recommendation agent 290 anticipates that the battery efficiency may degrade down to 25% before the battery will be replaced. Some decrease in operational efficiency at each client information handling system (e.g., 250) is unavoidable due to wear and tear of components, such as, for example, the battery 244. Thus, the CO2 emitted per hour is expected to increase over time, even when the client device 250 is being used as efficiently as possible, due to decreased efficiency of the battery 244 as it ages. In other words, even if the updating and execution of software and firmware and power consumption of various components (e.g., 220, 242, 243, 245, 246, 247, 248 or 249) are optimized for minimizing CO2 emissions, increases in CO2 emissions during operation of the client information handling system will still occur. The recommendation agent 290 in an embodiment differentiates such unavoidable increases in CO2 emissions due to aging from further increases in CO2 emissions due to avoidable inefficient usage of the client information handling system 250 (e.g., due to failure to perform updates, non-optimized execution of software or firmware, or non-eco-friendly power consumption by hardware components).

The second state in an embodiment may define a maximum CO2 emissions value for the client information handling system 250 when the device is being used as efficiently as possible, but that also takes into account the age of the client information handling system 250 and its components (e.g., battery 244). For example, the recommendation agent 290 in an embodiment in which the CO2 emissions state two transition threshold value is set at 0.091 pounds CO2 per day and the determined minimum allowable battery efficiency is 25% may determine a CO2 emissions state three transition threshold value of five times the CO2 emissions state two transition threshold value, or 0.364 pounds CO2 per day. This maximum CO2 emissions value defining the second state in embodiments may be referred to herein as a non-eco-friendly state transition threshold value. When operation of the client information handling system 250 causes emission of CO2 beyond this non-eco-friendly state transition threshold value, the client information handling system 250 may pass from the second state to the third, non-eco-friendly state in which inefficient operation of the device unrelated to age causes increased CO2 emissions. In such a way, the recommendation agent 290 may estimate CO2 emissions for optimally efficient usage of the client information handling system 250, given the unavoidable drop in efficiency of its battery.

Returning to the discussion of the monitoring period, following the training period in which the three CO2 emissions states have been defined, the recommendation agent in an embodiment may edit the indexed and classified JSON incident described above with respect to block 418 to include a CO2 emissions value and CO2 emissions state for the client information handling system. For example, the recommendation agent 290 may edit the classified and indexed JSON incident described above with respect to blocks 418 and 420 to generate the below CO2 determined JSON incident:

```
{
  "data" :
  {
    "event_id" : 123460,
    "source_ID" : CO2_emissions_state_prediction_system,
    "timestamp_unixtime_ms" : 1544145450,
    "client_device_ID" : 456789,
    "client_device_model" : Laptop_7400,
    "location" : Paris_France,
    "custom_flags" :
```

-continued

```
{
    "fan_workload" : 0.90,
    "Unsuccessful_initialization_attempt" : gaming_app,
    "CO2_emissions_value_lbsCO2_perday" : 0.35,
    "CO2_emissions_state" : 2,
    "CO2emissions_statetwo_threshold" : 0.091,
    "CO2emissions_statethree_threshold" : 0.364,
}
"device_current_state :
{
    "NID_1_type" : WLAN,
    "NID_2_type" : WWAN,
    "NID_2_data_transceived" : 100 GB,
    "NID_3_type" : BT,
    "memory_type" : 16_GB,
    "CPU_type" : X_Series,
    "GPU_type" : G_Series,
    "SSD_type" : 256_GB,
    "Display_type" : 15.6_HD_OLED,
    "fan_driver_version" : 14.2,
    "Display_mode" : high_definition,
    "Camera_type" : webcam,
    "Camera_detection_mode" : continuous_monitor,
    "Camera_capture_mode" : high_resolution,
    "OS_Version" : 10.2,
    "efficiency_battery" : 0.59,
    "usage_time_hours_perday" : 15,
    "fan_power_consumption_watts" : 60,
    "total_power_consumption_watts_perday" : 100,
    "active_browsing_hours_perday" : 15,
}
}
"incident_class" : Workload,
}
```

At block 424 in an embodiment, the data segregator may determine whether the $CO_2$ determined JSON incident indicates that the client information handling system is operating in state two. Following definition of the $CO_2$ emissions states, as described directly above, a $CO_2$ emissions monitoring period may begin, in which the recommendation agent 290 routinely receives indexed and classified JSON incidents (e.g., as described at block 420), and for each JSON incident received, determines the $CO_2$ emissions value (e.g., as described directly above) and the $CO_2$ emissions state indicated by the indexed and classified JSON incident. In an embodiment, the data segregator 266 may determine the $CO_2$ emissions state of the client information handling system 250, based on the determined $CO_2$ emissions value and the defining $CO_2$ emissions state threshold values. For example, the data segregator 266 may determine that the client information handling system 250 that emitted 0.35 pounds $CO_2$ per day, as indicated by a recently received indexed and classified JSON incident described directly above, is operating in the second state, because it is above the $CO_2$ emissions state two threshold value of 0.091 pounds $CO_2$ per day, but below the $CO_2$ emissions state three threshold value of 0.364 pounds $CO_2$ per day.

If the information handling system is operating within $CO_2$ emissions state two, the protective $CO_2$ emissions minimization system at the UEM platform may monitor operational telemetry measurements for the client information handling system to predict when the client information handling system may transition to the non-eco-friendly $CO_2$ emissions state three. The method may then proceed to block 426 for creation of a $CO_2$ state monitoring period JSON incident including such operational telemetry measurements and transmission of that telemetry to the protective $CO_2$ emissions minimization system. If the information handling system is not operating within $CO_2$ emissions state two (e.g., within either state one, or state three) it may not be appropriate for the protective $CO_2$ emissions minimization system at the UEM platform to monitor operational telemetry measurements for the client information handling system to predict when the client information handling system may transition to the non-eco-friendly $CO_2$ emissions state three, either because such a transition has already occurred or because such a transition is not likely until the client information handling system transitions to $CO_2$ emissions state two. In such a case, the data segregator may pro-actively limit transmission of the operational telemetry measurements for the client information handling system to the protective $CO_2$ emissions minimization system. The method may then end. In such a way, the data segregator may segregate operational telemetry measurements that are useful for predictions made by the protective $CO_2$ emissions minimization system from those that are not, and may pro-actively limit unnecessary power consumption and transmissions to the UEM platform.

The recommendation agent in an embodiment in which the data segregator determines the client information handling system is operating in $CO_2$ emissions state two may edit the $CO_2$ determined monitoring period JSON incident to include the $CO_2$ emissions state two transition threshold value, $CO_2$ emissions state three transition threshold value, and usage profiles to create a $CO_2$ state monitoring period JSON incident at block 426. For example, the recommendation agent 290 in an embodiment may edit the $CO_2$ determined monitoring period JSON incident generated at block 422 to include the $CO_2$ emissions state two transition threshold value and $CO_2$ emissions state three transition threshold value determined by the recommendation agent, as described above at block 422 to provide the following $CO_2$ state monitoring period JSON incident:

```
{
    "data" :
    {
        "event_id" : 123460,
        "source_ID" : CO2_emissions_state_prediction_system,
        "timestamp_unixtime_ms" : 1544145450,
        "client_device_ID" : 456789,
        "client_device_model" : Laptop_7400,
        "location" : Paris_France,
        "custom_flags" :
        {
            "fan_workload" : 0.90,
            "Unsuccessful_initialization_attempt" : gaming_app,
            "gaming_application_GPU_usage" : 0.9,
            "background_application_memory_usage" : 0.9,
            "browsing_application_NID_usage" : 0.9,
            "CO2_emissions_value_lbsCO2_perday" : 0.35,
            "CO2_emissions_state" : 2,
            "CO2emissions_statetwo_threshold" : 0.091,
            "CO2emissions_statethree_threshold" : 0.364,
        }
        "device_current_state :
        {
            "NID_1_type" : WLAN,
            "NID_2_type" : WWAN,
            "NID_2_data_transceived" : 100 GB,
            "NID_3_type" : BT,
            "memory_type" : 16_GB,
            "CPU_type" : X_Series,
            "GPU_type" : G_Series,
            "SSD_type" : 256_GB,
            "Display_type" : 15.6_HD_OLED,
            "fan_driver_version" : 14.2,
            "Display_mode" : high_definition,
            "Camera_type" : webcam,
            "Camera_detection_mode" : continuous_monitor,
            "Camera_capture_mode" : high_resolution,
            "OS_Version" : 10.2,
```

```
    "efficiency_battery" : 0.59,
    "usage_time_hours_perday" : 15,
    "fan_power_consumption_watts" : 60,
    "total_power_consumption_watts_perday" : 100,
    "active_browsing_hours_perday" : 15,
    }
  }
  "incident_class" : Workload,
}
```

As described in greater detail above with respect to FIG. 2, and below with respect to FIG. 6, a neural network 286 operating at the UEM platform 200 may model a relationship between each of a plurality of user-adjustable operational telemetry measurement values indicated within a first-recorded CO2 state monitoring period JSON incident and the CO2 emissions state indicated within a second, later-recorded CO2 state monitoring period JSON incident. The protective CO2 emissions minimization system 280 in an embodiment may receive and input into such a trained neural network 286 a CO2 state monitoring period JSON incident from a first client information handling system (e.g., 250) to predict whether the client information handling system (e.g., 250) may transition from state two to the non-eco-friendly state three during the current monitoring period, based on the input of the CO2 state monitoring period JSON incident generated during the previous monitoring period.

The neural network 286 in an embodiment may be crowd-source trained on other sets of received CO2 state monitoring period JSON incidents from a plurality of client information handling systems (e.g., 250 and 270) using the same frequency of monitoring periods as that used by the information handling system 250. Further, in some embodiments, a separate neural network (e.g., 286) may be trained for each of a plurality of usage profiles for the plurality of client information handling systems. For example, such usage profiles may specify the type of activities for which the client information handling system (e.g., 250 or 270) has been purchased. More specifically, example usage profiles may identify the client information handling system 250 as a corporate device used primarily for presentations, accounting, or enterprise-wide communications, or as a testing device used for operational testing of various peripherals or hardware components. In another example, usage profiles may identify the client information handling system 250 as a code-compiling or software application development machine, a device used primarily as a home computer or personal computer, or a device intended for use as a gaming platform. In an example embodiment, this information may be determined based on user input via a GUI during initial startup of the client information handling system (e.g., 250) following its purchase. The data segregator 266 in an example embodiment may include a JSON event named "usage_profile" having a value of "corporate," or any of the other above-described usage profiles or other contemplated usage profiles within the CO2 state monitoring period JSON incident.

In an embodiment in which the client information handling system is associated with a usage profile, the recommendation agent 290 may also include the usage profile within the CO2 determined JSON incident generated at block 422 to create a CO2 state monitoring period JSON incident. The recommendation agent 290 in such an embodiment may then transmit the CO2 state monitoring period JSON incident to the protective CO2 emissions minimization system 280 at the UEM platform 200. The process of blocks 402-426 in various embodiments described herein may be repeated at the end of each monitoring period, thus resulting in the client information handling system 250 transmitting a plurality of CO2 state monitoring period JSON incidents to the protective CO2 emissions minimization system 280 over time. Such a process may also be repeated for a plurality of other client information handling systems (e.g., 270) within an enterprise network in an embodiment. These monitoring periods may occur repeatedly throughout the lifecycle of the client information handling system in order to predict, based on gathered CO2 determined JSON incidents, whether the information handling system may imminently shift from state two to the non-eco-friendly state three. The method may then end.

Figure 5:
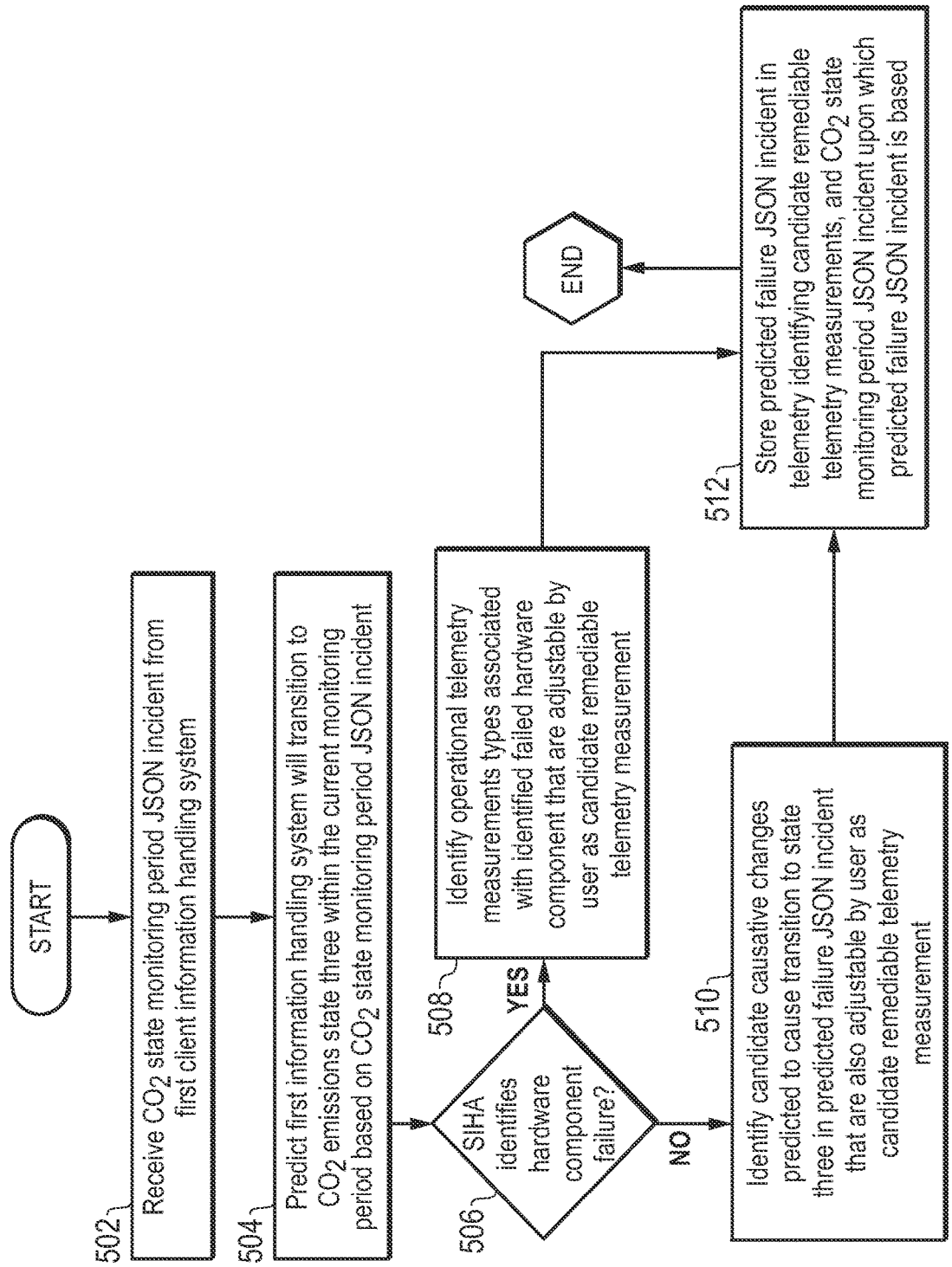
FIG. 5 is a flow diagram illustrating a method of identifying a candidate client device operation cause for a predicted transition to a non-eco-friendly $CO_2$ emissions state three according to an embodiment of the present disclosure.

FIG. 5 is a flow diagram illustrating a method of identifying an operational telemetry measurement that may be a user-adjustable operational telemetry measurement as a candidate client device operation cause for a prediction that a client information handling system will transition to a non-eco-friendly CO2 emissions state three according to an embodiment of the present disclosure. As described herein, execution of code instructions for a cloud-based protective CO2 emissions minimization system may predict when the client information handling system via hardware processing resources at a UEM platform is likely to move from the second state to the third state by increasing CO2 emissions beyond the non-eco-friendly state transition threshold value described above, due to inefficiencies not related to age, but which may be compounded with age of the client information handling system. The protective CO2 emissions minimization system in embodiments may also identify one or more CO2 increase causative operational telemetry measurements that may be user-adjustable operational telemetry measurements found in a most recently received CO2 state monitoring period JSON incident that could cause such a transition to the non-eco-friendly CO2 emissions state.

At block 502, the communication agent operating at the UEM platform in an embodiment may receive, and store in telemetry, CO2 state monitoring period JSON incidents from a plurality of client information handling systems over a plurality of monitoring periods. These CO2 state monitoring period JSON incidents may include operational telemetry measurements, including user-adjustable operational telemetry measurements, such as power analytics, software application analytics, and event viewer error logs, as well as determined CO2 emissions values and state transition threshold values unique to each client information handling system. These CO2 state monitoring period JSON incidents may be gathered (e.g., as described above with respect to blocks 414-416 of FIG. 4) during routine monitoring periods from a plurality of client information handling systems at the cloud-based protective CO2 emissions minimization system. For example, the communication agent 281 in an embodiment described above with respect to FIG. 2 may receive a plurality of CO2 state monitoring period JSON incidents from the first client information handling system 250 and the second client information handling system 270 over a plurality of monitoring periods. More specifically, the communication agent 281 in an embodiment may receive the CO2 state monitoring period JSON incident described above at block 426 of FIG. 4.

The code instructions of the protective carbon dioxide (CO2) emissions minimization system executing on hardware processing resources at the UEM platform in an embodiment at block 504 may predict, via a neural network, that the client information handling system will transition to a non-eco-friendly $CO_2$ emissions state three. The protective $CO_2$ emissions minimization system 280 in an embodiment may first input a received $CO_2$ state monitoring period JSON incident from the first client information handling system 250 into a crowd-source trained neural network 286. The protective $CO_2$ emissions minimization system 280, for example, may input the $CO_2$ state monitoring period JSON incident described above at block 426 of FIG. 4 measuring operational telemetry during the previous monitoring period for the client information handling system 250 into the neural network 286 and feed-forward these input values to produce an initial output estimated $CO_2$ emissions value for the first information handling system 250 during the current monitoring period. If the output $CO_2$ emissions value from the neural network 286 exceeds the $CO_2$ emissions state three transition threshold value also included within the received $CO_2$ state monitoring period JSON incident (e.g., as described above with reference to FIG. 4 at block 426), this may indicate that the neural network 286 predicts that the client information handling system 250 will transition from state two to the non-eco-friendly state three during the current monitoring period. As described in greater detail below with respect to FIG. 6 and the remaining blocks of FIG. 5, upon predicting that the client information handling system 250 may transition to the non-eco-friendly state three during the current monitoring period, the protective $CO_2$ emissions minimization system may determine one or more remediation user instructions that the user of the client information handling system 250 may execute to adjust user-adjustable operational telemetry levels in order to pro-actively limit such a transition.

At block 506, a systems internal health assessor operating at the UEM platform may determine whether a hardware component failure is indicated within the most recently received $CO_2$ state monitoring period JSON incident in an embodiment. In an embodiment in which a hardware component failure has occurred, the protective $CO_2$ emissions minimization system may identify one or more remediation user instructions capable of reversing such a component failure as capable of pro-actively limiting the predicted transition to the non-eco-friendly $CO_2$ emissions state three. In some embodiments, code instructions of a systems internal health assessor (SIHA) executing on processing resources at the Unified Endpoint Management (UEM) platform may identify one or more $CO_2$ state monitoring period JSON incidents indicating hardware failure. For example, the SIHA 283 operating at the UEM platform 200 in an embodiment may identify one or more $CO_2$ state monitoring period JSON incidents received from the client information handling system (e.g., 250 or 270) indicating hardware failure at those devices.

A systems internal health assessor (SIHA) of the UEM platform 200 in an embodiment may identify the $CO_2$ state monitoring period JSON incident received at block 502 as indicating failure of a hardware component of a given hardware type, or substantial functional inefficiency. For example, the SIHA 283 in an embodiment may search the $CO_2$ state monitoring period JSON incident described above with respect to block 426, which has been transmitted to the communication agent 281 and stored in telemetry 282 for JSON events named "WHEA_Error," indicating an error, such as a substantial inefficiency in the function a hardware component. Upon identification of such an error, alone or as part of a sequence of errors, associated with an identified hardware component, the SIHA 283 may transmit a notification to the communication agent 281 that the $CO_2$ state monitoring period JSON incident (e.g., identified by even-t_id given within the $CO_2$ state monitoring period JSON incident), or sequence of JSON incidents indicates poor health of a hardware component. In other embodiments, the SIHA 283 may identify $CO_2$ state monitoring period JSON events named "WHEA_Error," having values identifying any of the hardware components (e.g., 220, 242, 243, 244, 245, 246, 247, 248, or 249) included within the first client information handling system 250. The SIHA 283 in such embodiments may accordingly notify the communication agent 281 of the $CO_2$ state monitoring period JSON incident including such errors or sequence of errors and indicating poor health of the identified hardware component.

In another aspect, the telemetry 282 may also comprise failed operational telemetry including results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs translated into $CO_2$ state monitoring period JSON incidents of hardware failures, errors, or underperformance or sequences of the same at reporting client information handling systems (e.g., 250 or 270). In other embodiments, the SIHA 283 may determine that a component is failing if one or more $CO_2$ state monitoring period JSON incidents for the information handling system (e.g., 250) using that hardware component (e.g., 242) include a number of errors for that component (e.g., 242) that meets or exceeds a maximum error threshold (e.g., numbers of errors at 100, 50, 10, 5) within a preset period of time (e.g., 24 hours) and which may be alone or in combination with a sequence of errors. These are only example maximum error threshold values and preset time period values, and any values for these thresholds are contemplated herein.

As another example, the SIHA 283 may determine that a component is failing if one or more $CO_2$ state monitoring period JSON incidents for the information handling system (e.g., 250) indicate a test benchmark score for that component (e.g., 242) that falls below a preset minimum benchmark threshold value (e.g., 85% of average crowd-sourced benchmark value) alone or as port of a sequence of errors or reported issues. As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a hardware processor is failing may be 90%, for example.

If the SIHA identifies hardware component failure within the most recently received CO2 state monitoring period JSON incident, this may indicate a need to analyze whether a remediation user instruction for reversing such a failure may effectively pro-actively limit the predicted transition to the non-eco-friendly CO2 emissions state three. The method may then proceed to block 508 for identification of the user-adjustable operational telemetry measurements indicating such hardware component failure as a candidate user-adjustable remediable telemetry measurement. If the SIHA does not identify any hardware component failure within the most recently received CO2 state monitoring period JSON incident, this may indicate a need to identify other user-adjustable operational telemetry measurements associated with remediation user instructions that may effectively pro-actively limit the predicted transition to the non-eco-friendly CO2 emissions state three. The method may then proceed to block 510 for identification of these other user-adjustable operational telemetry measurements not indicating such hardware component failure as candidate remediable telemetry measurements by execution of one or more remediation user instructions.

The protective CO2 emissions minimization system in an embodiment at block 508 may identify the operational telemetry measurement types associated with the failed hardware component identified at block 506 and adjustable by the user as candidate remediable telemetry measurements. As described herein, the protective CO2 emissions minimization system 280 may determine one or more remediation user instructions that the user of the client information handling system 250 may execute in order to pro-actively limit a predicted transition for the client information handling system 250 to the non-eco-friendly CO2 emissions state three. In order to determine such remediation user instructions, the protective CO2 emissions minimization system 280 may first identify one or more user-adjustable operational telemetry measurements included within the most recently received CO2 state monitoring period JSON incident that could have caused the neural network 286 to predict such a transition to the non-eco-friendly CO2 emissions state three. Because the ultimate goal is generation of a remediation user instruction to adjust the user-adjustable operational telemetries measured within CO2 state monitoring period JSON incidents to pro-actively limit such a transition, the protective CO2 emissions minimization system 280 may focus on operational telemetries that are adjustable by the user via such remediation user instructions. In such a way, the protective CO2 emissions minimization system 280 may narrow the field of remediation user instructions for reversing hardware component failure analyzed by the neural network to determine if such remediation user instructions may effectively pro-actively limit such a transition, as described in greater detail below with respect to FIG. 6.

For example, in an embodiment in which the SIHA 283 has identified failure of the fan at block 506, the protective CO2 emissions minimization system 280 may identify each JSON event having a name that includes the word "fan" within the most recently received CO2 state monitoring period JSON incident. More specifically, the protective CO2 emissions minimization system 280 may identify the JSON event "fan_driver_version" to determine whether this JSON event is associated with a known remediation user instruction for adjusting the value associated with the JSON event "fan_driver_version" to pro-actively limit transition to the non-eco-friendly CO2 emissions state three. This may be repeated for each hardware component (e.g., 222, 242, 243, 244, 245, 246, 247, or 248) that the SIHA 283 may have identified as failing at block 506.

The protective CO2 emissions minimization system 280 may then determine which of these identified JSON events is associated with such a remediation user instruction in telemetry 282. As described herein, the protective CO2 emissions minimization system 280 may ultimately recommend a specific instruction that may be implemented by the user of the client information handling system 250 to pro-actively limit the predicted transition to the non-eco-friendly CO2 emissions state three. Because the ultimate goal is generation of a remediation user instruction to adjust the user-adjustable operational telemetries measured within CO2 state monitoring period JSON incidents, the protective CO2 emissions minimization system 280 may focus on operational telemetries that are adjustable by the user via such remediation user instructions. In such a way, the protective CO2 emissions minimization system 280 may narrow the field of remediation user instructions analyzed by the neural network for determination as to whether such remediation user instructions may effectively pro-actively limit such a transition, as described in greater detail below with respect to FIG. 6.

Such remediation user instructions and their associations with various user-adjustable operational telemetry measurements in an embodiment may be stored in telemetry 282, for example. Telemetry 282 in an embodiment may store a list of identified JSON event names found within a plurality of CO2 state monitoring period JSON incidents whose values may be adjusted through a specific remediation user instruction to pro-actively limit the transition to the non-eco-friendly CO2 emissions state three. For example, the protective CO2 emissions minimization system 280 in an embodiment in which the SIHA 283 has identified failure of the fan may search telemetry 282 to determine that the JSON event name "fan_driver_version" is user adjustable through a remediation user instruction to update the version of the driver for the fan 243 installed at the client information handling system 250.

In another example embodiment in which the SIHA 283 has identified failure of the GPU 242 may search telemetry 282 to determine that the JSON event named "gaming_application_GPU_usage" shown in the CO2 state monitoring period JSON incident (e.g., as described with reference to FIG. 4 at block 426) as user adjustable through a remediation user instruction to cap the number of GPU 242 resources made available during execution of a gaming application at the client information handling system 250. In yet another example, in which the SIHA 283 has identified failure of the memory 246 may search telemetry 282 to determine that a JSON event name "background_application_memory_usage" shown in the CO2 state monitoring period JSON incident is user adjustable through a remediation user instruction to cap the number of memory 246 resources made available during execution of background applications at the client information handling system 250. As a further example, in which the SIHA 283 has identified failure of the network interface device 222 may search telemetry 282 to determine that a JSON event name "browsing_application_NID_usage" shown in the CO2 state monitoring period JSON incident is user adjustable through a remediation user instruction to cap the number of network interface device 222 resources made available during execution of internet browsing software applications at the client information handling system 250.

In an embodiment, the protective CO2 emissions minimization system 280 may identify any one of these JSON event names for user-adjustable operational telemetry measurements associated with both a hardware failure and a remediation user instruction as a candidate remediable telemetry measurement. As described in greater detail with respect to FIG. 6, the neural network 286 may analyze whether any one or combination of the remediation user instructions associated with these candidate remediable telemetry measurements could pro-actively limit the predicted transition to the non-eco-friendly CO2 emissions state three. The method may then proceed to block 512 for storage of a predicted failure JSON incident identifying each of these candidate remediable telemetry measurements within telemetry 282.

At block 510, in an embodiment in which the SIHA does not identify a hardware component failure, the protective CO2 emissions minimization system may identify remediation user instructions not associated with failing hardware components as candidate remediable telemetry measurements. For example, even if the SIHA 283 does not identify a failure of the fan 243, GPU 242, memory 246, network interface device 222, or any other hardware component, the protective CO2 emissions minimization system 280 may still identify any JSON events having names including any of these components (e.g., "fan_driver_version") as a candidate remediable telemetry measurement, if that JSON event name is also associated with a remediation user instruction, as described directly above.

In other embodiments, the protective CO2 emissions minimization system 280 may also determine whether other JSON event names that do not identify any specific hardware components may be associated with a remediation user instruction in telemetry 282. For example, telemetry 282 may store a JSON event name "OS_version" shown in the CO2 state monitoring period JSON incident as user adjustable through a remediation user instruction to update the version of the operating system installed at the client information handling system 250. As another example, telemetry 282 may identify a JSON event name "active_browsing_hours_perday" shown in the CO2 state monitoring period JSON incident as user adjustable through a remediation user instruction to cap the number of active browsing windows or amount of time windows are left active for browsing the internet.

These are only a few examples of JSON event names associated with remediation user instructions. It is contemplated that telemetry 282 in other embodiments may store an association between a remediation user instruction capable of causing a change in the value associated with a user-adjustable operational telemetry measurement identified through the name of a JSON event within CO2 state monitoring period JSON incidents and the name of the JSON event. For example, other embodiments contemplate a remediation user instruction for changing any hardware policy settings or software application policy settings controllable by the power analytics module 240 or application analytics module 230, and the JSON event name (e.g., "fan_power_consumption," "CPU_power_consumption," "GPU_interrupts_gaming_application").

In another embodiment, the protective CO2 emissions minimization system 280 in an embodiment may further narrow the field of remediation user instructions analyzed by the neural network to determine if such remediation user instructions may effectively pro-actively limit such a transition (as described in greater detail below with respect to FIG. 6) by only considering user-adjustable operational telemetry measurements whose values may change due to execution of remediation user instructions by a defined telemetry value causative change threshold value. For example, the protective CO2 emissions minimization system 280 may retrieve the CO2 state monitoring period JSON incident received from the client information handling system 250 just prior to the most recently received CO2 state monitoring period JSON incident that caused the neural network 286 to predict the transition to the non-eco-friendly CO2 emissions state three. In such an example embodiment, the older CO2 state monitoring period JSON incident may include a JSON event named "active_browsing_hours_perday," having a value of 8, while the most recently received CO2 state monitoring period JSON incident (e.g., as described above at block 426 of FIG. 4) includes a JSON event of the same name, having a value of 15. This may indicate a 187.5% increase in the value for the user-adjustable operational telemetry measurement of active hours spent browsing the internet and associated with the JSON event name "active_browsing_hours_perday" between two consecutive CO2 state monitoring periods at the client information handling system 250.

The protective CO2 emissions minimization system 280 in an embodiment may only consider the user-adjustable operational telemetry measurement identified by the JSON event name "active_browsing_hours_perday" as a candidate client device operation cause for the predicted transition to the non-eco-friendly CO2 emission state three if this 187.5% increase meets or exceeds the telemetry value causative change threshold value defined for this user-adjustable operational telemetry measurement. For example, the user-adjustable operational telemetry measurement associated with the JSON event name "active_browsing_hours_perday" may be associated in telemetry 282 with a telemetry value causative change threshold value of 150% in an embodiment. In such a case, the 187.5% increase may exceed the telemetry value causative change threshold value of 150%, and the neural network may consider the user-adjustable operational telemetry measurement named "active_browsing_hours_perday" as a candidate client device operation cause for the predicted transition to the non-eco-friendly CO2 emissions state three, as described in greater detail below with respect to FIG. 6. In another example embodiment, the user-adjustable operational telemetry measurement associated with the JSON event name "active_browsing_hours_perday" may be associated in telemetry 282 with a telemetry value causative change threshold value of 200% in an embodiment. In such a case, the 187.5% increase may not meet the telemetry value causative change threshold value of 200%, and the neural network may not consider the user-adjustable operational telemetry measurement named "active_browsing_hours_perday" as a candidate client device operation cause for the predicted transition to the non-eco-friendly CO2 emissions state three that may be remedied by a remediation user instruction.

The protective CO2 emissions minimization system in an embodiment at block 512 in which the neural network has predicted the client information handling system will transition to the non-eco-friendly CO2 emissions state three within the current monitoring period may store a predicted failure JSON incident in telemetry. Upon determination of one or more candidate remediable telemetry measurements (e.g., as associated with a hardware failure at block 508, or not associated with specific hardware failure at block 510), the protective CO2 emissions minimization system in an embodiment may generate and store in telemetry a predicted failure JSON incident. Such a predicted failure JSON incident in an embodiment may identify the most recently received CO2 state monitoring period JSON incident input into the neural network to cause the predicted transition to the non-eco-friendly CO2 emissions state three and each of the identified candidate remediable telemetry measurements. For example, the protective CO2 emissions minimization system 280 may generate the following predicted failure JSON incident in an embodiment in which the identified candidate remediable telemetry measurements (e.g., identified at block 508 or 510) include predicted failure of the fan by the SIHA 283, and the JSON event names "gaming_application_GPU_usage," "background_application_memory_usage," browsing_application_NID_usage," "fan_driver_version," "OS_version," and "active_browsing_hours_perday":

```
{
  "data" :
  {
    "event_id" : 987654,
    "source_ID" : CO2_emissions_state_prediction_system,
    "timestamp_unixtime_ms" : 1544145490,
    "custom_flags" :
      {
        "reference_CO2_monitoring_incident_event_id" : 123459,
        "predicted_failure_hardware_component" : fan,
        "predicted_failure_cause_A" : gaming_application_GPU_usage,
        "predicted_failure_cause_B" :
        Background_application_memory_usage,
        "predicted_failure_cause_C" :
        Browsing_application_NID_usage,
        "predicted_failure_cause_D" : Fan_driver_version,
        "predicted_failure_cause_E" : OS_version,
        "predicted_failure_cause_F" : active_browsing_hours_perday,
      }
  }
}
```

As described below with respect to FIG. 6, the protective CO2 emissions minimization system in an embodiment may use the neural network to determine whether any known remediation user instructions associated with the identified candidate remediable telemetry measurements may effectively pro-actively limit the transition to the non-eco-friendly CO2 emissions state three. The method for identifying a user-adjustable operational telemetry measurement as a candidate client device operation cause for a prediction that a client information handling system will transition to a non-eco-friendly CO2 emissions state three may then end.

FIG. 6 is a flow diagram illustrating a method of transmitting recommended remediation user instructions for minimizing CO2 emissions at a client information handling system according to an embodiment of the present disclosure. As described herein, the protective CO2 emissions minimization system in an embodiment may use the neural network to determine whether any known remediation user instructions associated with the candidate remediable telemetry measurements identified in FIG. 5 may effectively pro-actively limit the transition to the non-eco-friendly CO2 emissions state three.

At block 602, the protective CO2 emissions minimization system in an embodiment may identify the first of the candidate remediable telemetry measurements determined above with respect to FIG. 5 as the measurement of interest. For example, in an embodiment described above with respect to FIG. 5 at blocks 508 and 512, the protective CO2 emissions minimization system 280 may identify candidate remediable telemetry measurements including predicted failure of the fan by the SIHA 283, and the JSON event names "gaming_application_GPU_usage," "background_application_memory_usage," browsing_application_NID_usage," "fan_driver_version," "OS_version," and "active_browsing_hours_perday." The protective CO2 emissions minimization system in an embodiment at block 602 may identify the predicted failure of the fan by the SIHA 283 as the measurement of interest, for predicting whether the remediation user instruction for modifying the measurement of interest may pro-actively limit the transition to the non-eco-friendly CO2 emissions state three, as described directly below.

The protective CO2 emissions minimization system in an embodiment at block 604 may identify an available remediation user instruction associated with the measurement of interest (e.g., the first candidate user-adjustable operational telemetry measurement). For example, in an embodiment described with reference to FIG. 2, in which the measurement of interest is a predicted or identified failure of the fan 243, such an identified hardware component failure may be associated in telemetry 282 with a remediation user instruction to update the firmware for the fan 243 that may adjust the user-adjustable operational telemetry measurement. More specifically, the identified failure of the fan 243 may be associated with a remediation user instruction to update the fan driver from version 14.2 to version 16.1. In another example, in which the measurement of interest is a high workload on the Graphics Processing Unit (GPU) 242 by a gaming application, such an identified user-adjustable operational telemetry measurement may be associated in telemetry 282 with a remediation user instruction to cap the GPU 242 resources made available to the gaming application at 85% of total available resources. In still another example, in which the measurement of interest is a high workload on the memory 246 by a background application, such an identified user-adjustable operational telemetry measurement may be associated in telemetry 282 with a remediation user instruction to cap the memory resources made available to the gaming application at 50% of total available resources. In yet another example, in which the measurement of interest is a high workload on the network interface device 220 by a browsing application, such an identified user-adjustable operational telemetry measurement may be associated in telemetry 282 with a remediation user instruction to cap the network interface device resources made available to the gaming application at 80% of total available resources. As yet another example, in which the measurement of interest is a high an outdated version of the OS, such an identified user-adjustable operational telemetry measurement may be associated in telemetry 282 with a remediation user instruction to update the OS version. In still another example, in which the measurement of interest is the number of hours for a browsing application to remain active, such an identified user-adjustable operational telemetry measurement may be associated in telemetry 282 with a remediation user instruction to cap the number of hours in which active browsing sessions are executed at eight hours per day.

At block 606, the protective CO2 emissions minimization system in an embodiment may input the measurement of interest reflecting implementation of the available remediation user instruction and other user-adjustable operational telemetry measurements from the most recently received CO2 state monitoring period JSON incident into the crowd-source trained neural network to predict CO2 emissions state for a client information handling system if the user executed the available remediation user instruction. For example, in an embodiment in which the available remediation user instruction includes updating the firmware for the fan 243, the protective CO2 emissions minimization system 280 may retrieve the CO2 state monitoring period JSON incident described above at block 426 of FIG. 4 for the client information handling system 250. The protective CO2 emissions minimization system 280 in such an embodiment may replace the value of 14.3 for the JSON event named "fan_driver_version" with a value of 16.1, reflecting the remediation user instruction to update the fan driver to version 16.1. The protective CO2 emissions minimization system 280 in an embodiment may then input this edited CO2 state monitoring period JSON incident into the neural network 286 modeling the relationship between operational telemetry measurements and CO2 emissions values. The output of the neural network 286 in an embodiment may represent a predicted CO2 emissions value for the client information handling system 250 if the user were to update the fan driver to version 16.1.

As another example, in an embodiment in which the JSON event named "gaming_application_GPU_usage," associated with a remediation user instruction to cap the GPU resources made available to the gaming application at 85% of total available resources is the measurement of interest, the protective CO2 emissions minimization system 280 may edit the CO2 state monitoring period JSON incident by replacing the value of 0.9 for the JSON event named "gaming_application_GPU_usage" with the value of 0.85. In yet another example, in an embodiment in which the JSON event named "background_applications_memory_usage," associated with a remediation user instruction to cap the memory resources made available to the background applications at 50% of total available resources is the measurement of interest, the protective CO2 emissions minimization system 280 may edit the CO2 state monitoring period JSON incident by replacing the value of 0.9 for the JSON event named "background_applications_memory_usage" with the value of 0.5. In still another example, in an embodiment in which the JSON event named "browsing_applications_NID_usage," associated with a remediation user instruction to cap the network interface device resources made available to the browsing application at 80% of total available resources is the measurement of interest, the protective CO2 emissions minimization system 280 may edit the CO2 state monitoring period JSON incident by replacing the value of 0.9 for the JSON event named "browsing_applications_NID_usage" with the value of 0.8.

In yet another example, in an embodiment in which the JSON event named "OS_version," associated with a remediation user instruction to update the OS system to the latest available version (e.g., 13.1) is the measurement of interest, the protective CO2 emissions minimization system 280 may edit the CO2 state monitoring period JSON incident by replacing the value of 10.2 for the JSON event named "OS_version" with the value of 13.1. As still another example, in an embodiment in which the JSON event named "active_browsing_hours_perday," associated with a remediation user instruction to decrease the number of hours in which browsing windows are allowed to remain active to eight hours total (across all active windows) is the measurement of interest, the protective CO2 emissions minimization system 280 may edit the CO2 state monitoring period JSON incident by replacing the value of 10.2 for the JSON event named "active_browsing_hours_perday" with the value of 8.

In some embodiments, the protective CO2 emissions minimization system may input edited CO2 state monitoring period JSON incidents reflecting more than one remediation user instruction into the neural network at one time. This may allow the protective CO2 emissions minimization system to determine whether execution of any combination of the identified remediation user instructions may pro-actively limit the transition to the non-eco-friendly CO2 emissions state three. For example, the protective CO2 emissions minimization system in an embodiment may test whether updating the OS version and capping the number of active browsing hours, in combination, may effectively pro-actively limit the transition to the non-eco-friendly CO2 emissions state three.

The protective CO2 emissions minimization system in an embodiment may determine at block 608 whether the neural network predicts that implementation of the remediation user instruction associated with the measurement of interest for the user-adjustable operational telemetry measurement being assessed will place the client information handling system into CO2 emissions state one or two. In other words, the protective CO2 emissions minimization system 280 in an embodiment may use the neural network 296 output to determine whether implementation of the remediation user instruction at the client information handling system 250 will pro-actively limit the transition at the client information handling system 250 from the CO2 emissions state two to the non-eco-friendly CO2 emissions state three previously predicted by the neural network to occur during the current monitoring period (e.g., as described above with respect to FIG. 5 at block 504). If the neural network predicts that implementation of the remediation user instruction associated with the measurement of interest at the client information handling system 250 will not pro-actively limit the transition to the non-eco-friendly CO2 emissions state three, the protective CO2 emissions minimization system 280 may not recommend such a remediation user instruction for implementation at the client information handling system 250. The method may then proceed to block 610 for analysis of the next candidate remediable telemetry measurement. If the neural network predicts that implementation of the remediation user instruction associated with the measurement of interest at the client information handling system 250 will pro-actively limit the transition to the non-eco-friendly CO2 emissions state three, the method may proceed to block 612 for the protective CO2 emissions minimization system 280 to prepare a recommendation for implementing the available remediation user instruction, or combination of remediation user instructions associated with the measurement of interest to adjust that user-adjustable operational telemetry measurement.

At block 610, in an embodiment in which the neural network predicts that implementation of the remediation user instruction associated with the measurement of interest at the client information handling system 250 will not pro-actively limit the transition to the non-eco-friendly CO2 emissions state three, the protective CO2 emissions minimization system 280 may identify the next candidate remediable telemetry measurement as the next measurement of interest. For example, the protective CO2 emissions minimization system 280 in an embodiment may identify the JSON event named "gaming_application_GPU_usage," associated with a remediation user instruction to cap the GPU resources made available to the gaming application at 85% of total available resources, as the measurement of interest. The method may then proceed back to block 604 for identification of an associated remediation user instruction and determination as to whether implementation of such a remediation user instruction may pro-actively limit the transition of the client information handling system 250 to the non-eco-friendly CO2 emissions state three.

The protective CO2 emissions minimization system 280 in an embodiment may also analyze whether any combination of the remediation user instructions associated with the candidate remediable telemetry measurement may effectively pro-actively limit such a transition. For example, after inputting the remediation user instructions associated with each candidate remediable telemetry measurement of interest into the neural network individually, the protective CO2 emissions minimization system 280 may then input a plurality of remediation user instructions associated with every possible combination of the candidate remediable telemetry measurements in an embodiment. By repeating the loop between blocks 604 and 610 in an embodiment, the protective CO2 emissions minimization system 280 may determine which of the remediation user instructions associated with the candidate remediable telemetry measurements identified in FIG. 5 may effectively pro-actively limit the predicted transition of the client information handling system 250 to the non-eco-friendly CO2 emissions state three.

The protective CO2 emissions minimization system in an embodiment in which the neural network predicts that implementation of the remediation user instruction associated with the measurement of interest at the client information handling system will pro-actively limit the transition to the non-eco-friendly CO2 emissions state three may generate a recommendation JSON incident at block 612 for recommending implementation of the remediation user instruction at the client information handling system. The recommendation made to the user of the client information handling system 250 in an embodiment may include one or more of the remediation user instructions identified at block 608 as likely to pro-actively limit the transition of the client information handling system 250 to the non-eco-friendly CO2 emissions state three. Such a recommendation in an embodiment may be given within a recommendation JSON incident and may also include identification of the candidate remediable telemetry measurements associated with those remediation user instructions (e.g., as an identified CO2 increase cause of the predicted transition), as well as a predicted CO2 emissions state after the remediation user instruction has been implemented, and a predicted hardware component life extension period for any parts identified by the SIHA as failing. The protective CO2 emissions minimization system 280 in an embodiment described in greater detail below with respect to FIG. 7 may determine such a predicted hardware component life extension period and a predicted CO2 emissions state based on crowd-sourced information drawn from other client information handling systems (e.g., 270) that have previously accepted or rejected the same recommendations given within the recommendation JSON incident generated at block 612.

In an example embodiment, the protective CO2 emissions minimization system 280 may generate the following recommendation JSON incident including a remediation user instruction to cap the GPU resources made available to the gaming application at 85%:

```
{
  "data" :
  {
    "event_id" : 987653,
    "source_ID" : protective_CO2_emissions_minimization_system,
    "timestamp_unixtime_ms" : 2984657051,
    "custom_flags" :
    {
      "reference_predicted_failure_event_id" : 987654,
      "Gaming_application_GPU_usage" : 0.85,
    }
  }
}
```

As shown above, the recommendation JSON incident may reference the predicted failure JSON incident generated as described with reference to FIG. 5 at block 512, having an event ID of 987654. As also described at block 512, the predicted failure JSON incident having the event ID 987654 may have identified a first candidate client device operation cause (e.g., "cause A") for a predicted transition to the non-eco-friendly CO2 emission state three as the gaming application consuming too many of the GPU resources (e.g., as indicated by the JSON event named "gaming_application_GPU_usage").

In another example embodiment, the protective CO2 emissions minimization system 280 may generate the following recommendation JSON incident including a remediation user instruction to install the latest version of the fan driver:

```
{
  "data" :
  {
    "event_id" : 987652,
    "source_ID" : protective_CO2_emissions_minimization_system,
    "timestamp_unixtime_ms" : 2984657052,
    "custom_flags" :
    {
      "reference_predicted_failure_event_id" : 987654,
      "Fan_driver_version" : fan_14.3.1,
    }
  }
}
```

As shown above, the recommendation JSON incident may reference the same predicted failure JSON incident generated as described with reference to FIG. 5 at block 512, having an event ID of 987654. As described at block 512, the predicted failure JSON incident having the event ID 987654 may have identified a first candidate client device operation cause (e.g., "cause D") for a predicted transition to the non-eco-friendly CO2 emission state three as the fan driver version being outdated or otherwise non-optimal (e.g., as indicated by the JSON event named "fan_driver_version").

In another example embodiment, the protective CO2 emissions minimization system 280 may generate the following recommendation JSON incident including a remediation user instruction to install the latest version of the OS, and to cap the number of active browsing hours:

```
{
  "data" :
  {
    "event_id" : 987651,
    "source_ID" : protective_CO2_emissions_minimization_system,
    "timestamp_unixtime_ms" : 2984657053,
    "custom_flags" :
      {
        "reference_predicted_failure_event_id" : 987654,
        "OS_version" : 11.0,
        "active_browsing_hours_perday" : 8,
      }
  }
}
```

As shown above, the recommendation JSON incident may reference the same predicted failure JSON incident generated as described with reference to FIG. 5 at block 512, having an event ID of 987654. As described at block 512, the predicted failure JSON incident having the event ID 987654 may have identified a first candidate client device operation cause (e.g., "cause F") for a predicted transition to the non-eco-friendly $CO_2$ emission state three as too many hours spent browsing (e.g., as indicated by the JSON event named "active_browsing_hours_perday") and a second candidate client device operation cause (e.g., "cause E") for a predicted transition to the non-eco-friendly $CO_2$ emission state three as the OS version being outdated or otherwise non-optimal (e.g., as indicated by the JSON event named "OS_version").

In yet another example embodiment, the protective $CO_2$ emissions minimization system 280 may generate the following recommendation JSON incident including a plurality of remediation user instructions:

```
{
  "data" :
  {
    "event_id" : 987650,
    "source_ID" : protective_CO2_emissions_minimization_system,
    "timestamp_unixtime_ms" : 2984657054,
    "custom_flags" :
      {
        "reference_predicted_failure_event_id" : 987654,
        "Gaming_application_GPU_usage" : 0.6,
        "Background_application_memory_usage" : 0.8,
        "Browsing_application_NID_usage" : 0.8,
        "Fan_driver_version" : fan_14.3.1,
        "active_browsing_hours_perday" : 8,
      }
  }
}
```

As shown above, the recommendation JSON incident may reference the same predicted failure JSON incident generated as described with reference to FIG. 5 at block 512, having an event ID of 987654. As described at block 512, the predicted failure JSON incident having the event ID 987654 may have identified a first candidate client device operation cause (e.g., "cause A") for a predicted transition to the non-eco-friendly $CO_2$ emission state three as the gaming application consuming too many of the GPU resources (e.g., as indicated by the JSON event named "gaming_application_GPU_usage"). The predicted failure JSON incident may also have identified a second candidate client device operation cause (e.g., cause "B") for a predicted transition to state three as the background applications consuming too many memory resources (e.g., as indicated by the JSON event named "background_application_memory_usage"). The predicted failure JSON incident may also have identified a third candidate client device operation cause (e.g., cause "C") for a predicted transition due to overuse of NID resources by the browsing application (e.g., as indicated by the JSON event named "browsing_application_NID_usage"). The predicted failure JSON incident may also have identified a fourth candidate client device operation cause (e.g., "cause D") for a predicted transition to the non-eco-friendly $CO_2$ emission state three as the fan driver version being outdated or otherwise non-optimal (e.g., as indicated by the JSON event named "fan_driver_version"). The predicted failure JSON incident may also have identified a fifth candidate client device operation cause (e.g., "cause F") for a predicted transition to the non-eco-friendly $CO_2$ emission state three as too many hours spent browsing (e.g., as indicated by the JSON event named "active_browsing_hours_perday") and a fifth candidate client device operation cause (e.g., "cause E") for a predicted transition to the non-eco-friendly $CO_2$ emission state three as the OS version being outdated or otherwise non-optimal (e.g., as indicated by the JSON event named "OS_version").

At block 614, the protective $CO_2$ emissions minimization system in an embodiment may determine whether all of the candidate remediable telemetry measurements have been analyzed to determine whether their associated remediation user instructions may effectively pro-actively limit the transition to the non-eco-friendly $CO_2$ emissions state three. If each of the candidate remediable telemetry measurements have been so analyzed, the method may proceed to block 616 for transmission of all recommendation JSON incidents generated through the loop between blocks 604 and 612, in which the neural network has predicted one or more remediation user instructions may effectively pro-actively limit the transition to the non-eco-friendly $CO_2$ emissions state three. If each of the candidate remediable telemetry measurements have not been so analyzed, the method may proceed back to block 610 to identify the next candidate remediable telemetry measurement as the measurement of interest. By repeating the loop between blocks 604 and 612, the protective $CO_2$ emissions minimization system in an embodiment may generate a recommendation JSON incident for each remediation user instruction or combination of remediation user instructions predicted by the neural network to effectively pro-actively limit the transition to the non-eco-friendly $CO_2$ emissions state three by adjusting one or more user-adjustable operational telemetry levels.

The protective $CO_2$ emissions minimization system in an embodiment at block 616 may transmit all recommendation JSON incidents generated during various iterations of block 612 to the information handling system for which a transition to the non-eco-friendly $CO_2$ emissions state three has been predicted. As described in greater detail below at FIG. 8 and above at FIG. 3, these recommended remediation user instructions within the recommendation JSON incidents may be displayed for selection by a user via a graphical user interface (GUI). The user may then choose whether to implement one or more of the recommended remediation user instructions.

At block 618, the protective $CO_2$ emissions minimization system in an embodiment may receive a post-recommendation $CO_2$ state monitoring period JSON incident from the information handling system for which a transition to the non-eco-friendly $CO_2$ emissions state three has been predicted. Such a post-recommendation $CO_2$ state monitoring period JSON incident may record many of the same types of operational telemetry measurements described with respect to the $CO_2$ state monitoring period JSON incident at block 426 of FIG. 4. However, these measurements, including user-adjustable operational telemetry measurements may have updated values indicating any effects of implemented remediation user instructions recommended by the protective CO2 emissions minimization system and selected by the user. For example, in an embodiment in which the user has selected to update the fan driver version based on a recommendation JSON incident generated at block 612, the post-recommendation CO2 state monitoring period JSON incident may include the JSON event named "fan_driver_version," but having an updated value of 14.3.1, as opposed to the value of 14.2 found in the CO2 state monitoring period JSON incident described above with respect to block 426 of FIG. 4. In another example, in an embodiment in which the user has chosen not to update the operating system or to cap the number of active browsing hours per day, this may result in failure of the fan, as predicted by the Systems Internal Health Assessor (SIHA) (e.g., as described above with respect to block 506 of FIG. 5). In such a case, the post-recommendation CO2 state monitoring period JSON incident received at block 618 may include one or more indicators of such a fan failure.

At block 620, the protective CO2 emissions minimization system in an embodiment may determine whether a hardware component failure has been detected within the post-recommendation CO2 state monitoring period JSON incident received at block 618. For example, as described directly above, in an embodiment in which the user has chosen not to update the operating system or to cap the number of active browsing hours per day, the post-recommendation CO2 state monitoring period JSON incident received at block 618 may include one or more indicators of fan failure. Such indicators may be identified by the SIHA, using the same method or approaches described above at block 506 of FIG. 5. If hardware failure has been detected, this may indicate that the recommendation generated at block 612, if accepted by the user, may have caused the hardware failure. On the other hand, if the user rejected the recommendation generated at block 612, and the hardware failure later occurred, this may indicate that the remediation user instruction within the recommendation did not cause the hardware failure. In both of these scenarios, the protective CO2 emissions minimization system may track such hardware failures and correlations or lack thereof between previous recommendations in order to inform later recommendations, as described in greater detail below with respect to FIG. 7. The method may then proceed to block 622 for associating the detected hardware failure and the previously transmitted recommendation JSON incident generated at block 612. If hardware component failure is not detected, the method may return to block 618 for routine monitoring to detect when a hardware failure eventually does occur.

The protective CO2 emissions minimization system in an embodiment in which a hardware failure has occurred, as indicated within a post-recommendation CO2 state monitoring period JSON incident may identify any rejected recommendation JSON incidents associated with the information handling system in telemetry. For example, as described in greater detail with respect to FIG. 8 below, upon rejection of a recommendation at the GUI for the client information handling system, the recommendation agent may generate a rejected recommendation JSON incident identifying the recommendation JSON incident generated at block 612 whose remediation user instructions the user chose not to implement. More specifically, as described below with respect to FIG. 8, the recommendation agent may transmit to telemetry a rejection recommendation JSON incident having an event ID of 987649 indicating rejection of the recommendation JSON incident having an event ID of 987651.

The protective CO2 emissions minimization system in an embodiment may also identify any accepted recommendation JSON incidents associated with the information handling system in telemetry. For example, as described in greater detail with respect to FIG. 8 below, upon acceptance of a recommendation at the GUI for the client information handling system, the recommendation agent may generate an accepted recommendation JSON incident identifying the recommendation JSON incident generated at block 612 whose remediation user instructions the user chose to implement. More specifically, as described below with respect to FIG. 8, the recommendation agent may transmit to telemetry an acceptance recommendation JSON incident having an event ID of 987648 indicating acceptance of the recommendation JSON incident having an event ID of 987651.

At block 624, the protective CO2 emissions minimization system in an embodiment may store in telemetry a rejected recommendation hardware failure JSON incident identifying the post-recommendation CO2 state monitoring period JSON incident indicating hardware failure, the failed hardware component, and the rejected recommendation JSON incident. In other embodiments, the protective CO2 emissions minimization system may store an acceptance recommendation JSON incident. For example, the protective CO2 emissions minimization system in an embodiment may store a rejected recommendation hardware failure JSON incident identifying the post-recommendation CO2 state monitoring period JSON incident received at block 618 which may indicate failure of the fan at the timestamp given within the post-recommendation CO2 state monitoring period JSON incident. The rejected recommendation hardware failure JSON incident may further identify failure of the fan, as detected by the SIHA, and the rejected recommendation JSON incident having an event ID of 987649 indicating rejection of the recommendation JSON incident to update the OS version and to cap the number of active browsing hours per day. In such a way, the protective CO2 emissions minimization system may track the effects of recommendations made and accepted or rejected by a user, as described in greater detail below with respect to FIG. 7. The method for transmitting recommended remediation user instructions for minimizing CO2 emissions at a client information handling system may then end.

Figure 7:
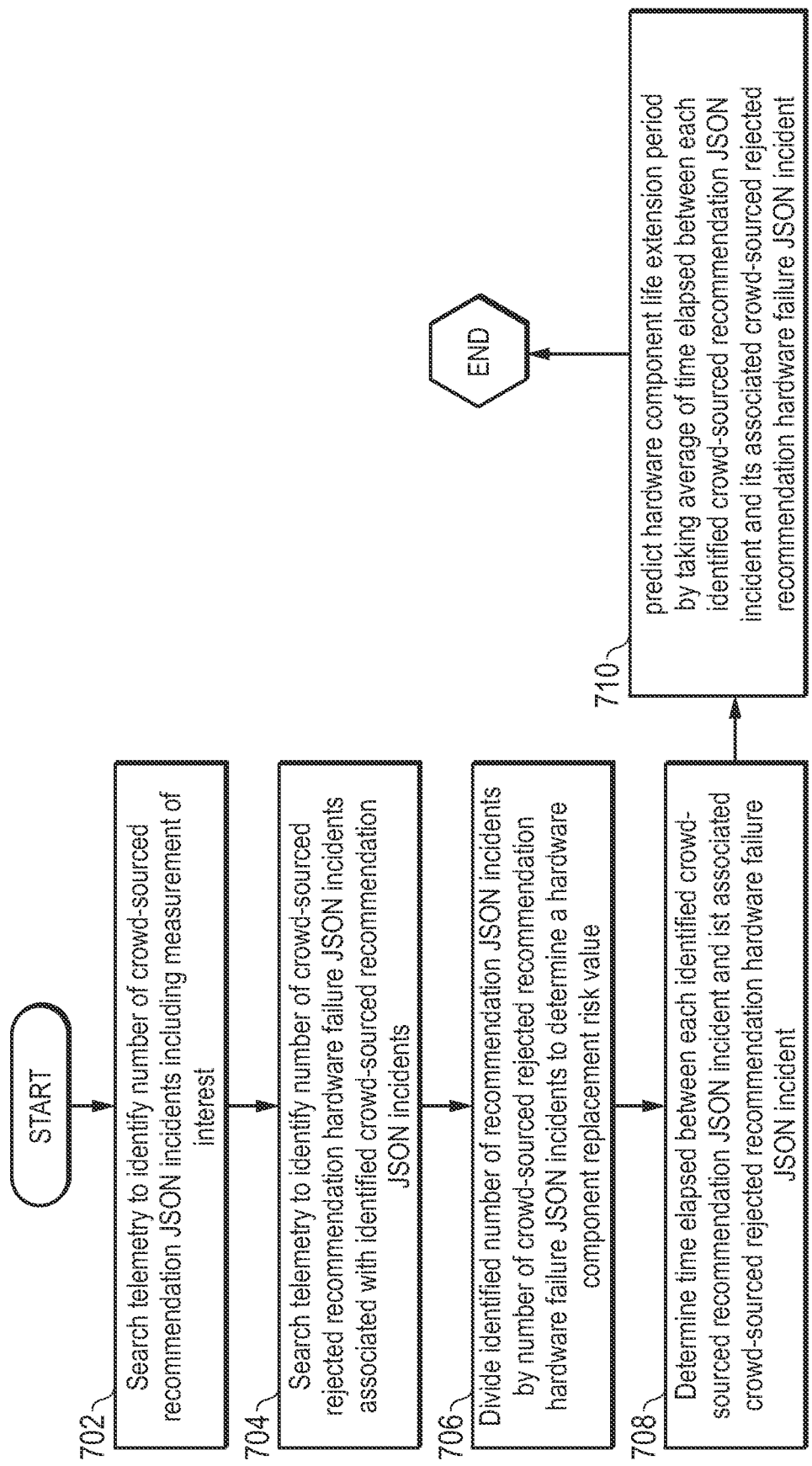
FIG. 7 is a flow diagram illustrating a method of predicting increase in hardware life and decrease in risk of hardware replacement for each recommended remediation user instruction according to an embodiment of the present disclosure.

FIG. 7 is a flow diagram illustrating a method of predicting increase in hardware life and decrease in risk of hardware replacement for each recommended remediation user instruction, when implemented at the client information handling system according to an embodiment of the present disclosure. As described herein, the protective CO2 emissions minimization system in an embodiment may transmit remediation user instructions predicted to pro-actively limit the transition at the first client information handling system to the non-eco-friendly CO2 emissions state three. These recommendations made to the user of the client information handling system in an embodiment may also include predicted CO2 emissions state after the remediation user instruction has been implemented to adjust user-adjustable operational telemetry levels, and a predicted hardware component life extension period for any parts identified by the SIHA as failing. FIG. 7 describes a method for determining such a predicted hardware component life extension period and a predicted CO2 emissions state based on crowd-sourced information drawn from other client information handling systems that have previously accepted or rejected the same recommendations. This process may be repeated for each of the measurements of interest for particular user-adjustable telemetry measurements that are correlated to a candidate client device operation causation of increases in $CO_2$ identified at block 602 and FIG. 6 above.

At block 702, the protective $CO_2$ emissions minimization system in an embodiment may search telemetry at the Unified Endpoint Management (UEM) platform to identify a number of crowd-sourced recommendation JSON incidents that include the measurement of interest. As described above with respect to block 612 of FIG. 6 and in an embodiment described with respect to FIG. 2, each time the protective $CO_2$ emissions minimization system 280 predicts that a remediation user instruction associated with a measurement of interest (e.g., a candidate remediable user-adjustable operational telemetry measurement) may effectively pro-actively limit the predicted transition to the non-eco-friendly $CO_2$ emissions state three at the client information handling system 250, it may generate a recommendation JSON incident that includes this recommendation. In such an embodiment, the recommendation JSON incident may then be transmitted to the client information handling system 250 for display to the user via a graphical user interface (GUI) 291, as described at block 616 of FIG. 6. These recommendation JSON incidents may be transmitted to any number of client information handling systems (e.g., 250 or 270) within an enterprise system experiencing increases in $CO_2$ emissions due to similar causes (e.g., failure of the same hardware components or inefficient or non-eco-friendly usage of the hardware, software, or firmware of client information handling systems 250 and 270). As also described with reference to FIG. 6 at block 612, each of these recommendation JSON incidents include a list of all measurements of interest (e.g., candidate remediable user-adjustable operational telemetry measurements) associated with the transmitted remediation user instructions, as a way of identifying such causes of predicted transition to a non-eco-friendly state.

Each of these recommendation JSON incidents, transmitted across a plurality of client information handling systems (e.g., 250 or 270) over time may be stored in telemetry 282 at the UEM platform 200. By determining the number of crowd-sourced recommendation JSON incidents that include the measurement of interest in an embodiment the protective $CO_2$ emissions minimization system 280 may gauge the number of recommendations made to correct increasing $CO_2$ emissions due to the same cause identified by the measurement of interest. For example, the protective $CO_2$ emissions minimization system 280 in an embodiment may search telemetry 282 to determine that 1,000 recommendation JSON incidents reference the measurement of interest represented by the JSON event name "fan_driver_version." This may indicate that the protective $CO_2$ emissions minimization system 280 in an embodiment has made 500 previous recommendations to correct a predicted transition to the non-eco-friendly $CO_2$ emissions state three most likely due to use of an outdated driver for the fan 243 at a plurality of other client information handling systems (e.g., including 270).

The protective $CO_2$ emissions minimization system in an embodiment may search telemetry at block 704 to identify a number of crowd-sourced rejected recommendation hardware failure JSON incidents associated with the identified crowd-sourced recommendation JSON incidents. As described in greater detail below in FIG. 8, each client information handling system (e.g., 250) in receipt of a recommendation JSON incident from the protective $CO_2$ emissions minimization system 280 may track whether or which recommendations are accepted or rejected by the user of the client information handling system 250. The recommendation agent 290 at the client information handling system 250 may do so by generating and transmitting to the protective $CO_2$ emissions minimization system 280 an accepted recommendation JSON incident when the user accepts a recommendation or a rejected recommendation JSON incident when the user rejects the recommendation. As also described in greater detail above with respect to FIG. 6, the protective $CO_2$ emissions minimization system 280 may track hardware failure occurring after a user has rejected a recommendation to adjust user-adjustable functionality of that hardware component by generating a rejected recommendation hardware failure JSON incident that links the identified hardware component with the recommendation, rejected by the user, that the protective $CO_2$ emissions minimization system previously predicted would pro-actively limit such a failure. By identifying a number of these rejected recommendation hardware failure JSON incidents associated with the measurement of interest in an embodiment, the protective $CO_2$ emissions minimization system 280 may gauge the likelihood that rejecting a recommendation for adjustment of the measurement of interest will result in hardware failure.

For example, the protective $CO_2$ emissions minimization system in an embodiment in which the measurement of interest is the fan driver version may search telemetry 282 to identify a number of (for example 300) crowd-sourced rejected recommendation hardware failure JSON incidents associated with a number of (for example 1,000) identified crowd-sourced recommendation JSON incidents. As another example, the protective $CO_2$ emissions minimization system in an embodiment in which the measurement of interest is heavy workload on the GPU by a gaming application may search telemetry 282 to identify, for example, 100 crowd-sourced rejected recommendation hardware failure JSON incidents associated with the 1,000 identified crowd-sourced recommendation JSON incidents. In still another example, the protective $CO_2$ emissions minimization system in an embodiment in which the measurement of interest is heavy workload on the memory by background applications may search telemetry 282 to identify, for example, 50 crowd-sourced rejected recommendation hardware failure JSON incidents associated with the 1,000 identified crowd-sourced recommendation JSON incidents. In yet another example, the protective $CO_2$ emissions minimization system in an embodiment in which the measurement of interest is heavy workload on the network interface device by a browsing application may search telemetry 282 to identify, for example, 150 crowd-sourced rejected recommendation hardware failure JSON incidents associated with the 1,000 identified crowd-sourced recommendation JSON incidents. As yet another example, the protective $CO_2$ emissions minimization system in an embodiment in which the measurement of interest is the number of hours per day in which active browsing windows are executing may search telemetry 282 to identify, for example, 200 crowd-sourced rejected recommendation hardware failure JSON incidents associated with the 1,000 identified crowd-sourced recommendation JSON incidents. In still another example, the protective $CO_2$ emissions minimization system in an embodiment in which the measurement of interest is the OS version may search telemetry 282 to identify, for example, 400 crowd-sourced rejected recommendation hardware failure JSON incidents associated with the 1,000 identified crowd-sourced recommendation JSON incidents.

At block 706, the protective CO2 emissions minimization system in an embodiment may determine a hardware component replacement risk value associated with each recommendation. In such an embodiment, the protective CO2 emissions minimization system may do so by dividing the identified number of crowd-sourced rejected recommendation hardware failure JSON incidents by the number of recommendation JSON incidents. This may determine the percentage of times in which previous user rejections for the same recommendation have resulted in failure of a hardware component.

For example, the protective CO2 emissions minimization system in an embodiment in which the measurement of interest is the fan driver version may determine a fan replacement risk value of 30% (e.g., 300 divided by 1000). As another example, the protective CO2 emissions minimization system in an embodiment in which the measurement of interest is heavy workload on the GPU by a gaming application may determine a fan replacement risk value of 10% (e.g., 100 divided by 1000). In still another example, the protective CO2 emissions minimization system in an embodiment in which the measurement of interest is heavy workload on the memory by background applications may determine a fan replacement risk value of 5% (e.g., 50 divided by 1000). In yet another example, the protective CO2 emissions minimization system in an embodiment in which the measurement of interest is heavy workload on the network interface device by a browsing application may determine a fan replacement risk value of 15% (e.g., 150 divided by 1000). As yet another example, the protective CO2 emissions minimization system in an embodiment in which the measurement of interest is the number of hours per day in which active browsing windows are executing may determine a fan replacement risk value of 20% (e.g., 200 divided by 1000). In still another example, the protective CO2 emissions minimization system in an embodiment in which the measurement of interest is the OS version may determine a fan replacement risk value of 40% (e.g., 400 divided by 1000).

For each identified crowd-sourced rejected recommendation hardware failure JSON incident, the protective CO2 emissions minimization system in an embodiment may determine a time that has elapsed between each identified crowd-sourced recommendation JSON incident and its associated crowd-sourced rejected recommendation hardware failure JSON incident at block 708. In doing so, the protective CO2 emissions minimization system in an embodiment may gauge the amount of time that elapsed between the user accepting a recommendation intended to pro-actively limit a predicted hardware failure and that hardware failure ultimately occurring. In other words, such a determination may gauge the amount of time that the hardware components life was extended by accepting and executing the recommended remediation user instruction.

At block 710, the protective CO2 emissions minimization system in an embodiment may predict the hardware component life extension period by taking the average of the time periods determined above at block 708. In doing so, the protective CO2 emissions minimization system in an embodiment may use crowd-sourced information to estimate the amount of time by which life of a hardware component predicted to fail may be extended, assuming the user were to accept the recommendation associated with the crowd-sourced rejected recommendation hardware failure JSON incidents upon which such a determination were based.

For example, the protective CO2 emissions minimization system may determine that an average of 250 days elapsed between each identified crowd-sourced recommendation JSON incident recommending updating of the fan driver and an associated rejected recommendation hardware failure JSON incident indicating failure of the fan. As another example, the protective CO2 emissions minimization system may determine that an average of 100 days elapsed between each identified crowd-sourced recommendation JSON incident recommending capping of GPU resources made available to the gaming application and an associated rejected recommendation hardware failure JSON incident indicating failure of the fan. In still another example, the protective CO2 emissions minimization system may determine that an average of 50 days elapsed between each identified crowd-sourced recommendation JSON incident recommending capping of memory resources made available to the background applications and an associated rejected recommendation hardware failure JSON incident indicating failure of the fan. In yet another example, the protective CO2 emissions minimization system may determine that an average of 150 days elapsed between each identified crowd-sourced recommendation JSON incident recommending capping of network interface device resources made available to the browsing application and an associated rejected recommendation hardware failure JSON incident indicating failure of the fan. As yet another example, the protective CO2 emissions minimization system may determine that an average of 300 days elapsed between each identified crowd-sourced recommendation JSON incident recommending updating the OS version and an associated rejected recommendation hardware failure JSON incident indicating failure of the fan. In still another example, the protective CO2 emissions minimization system may determine that an average of 180 days elapsed between each identified crowd-sourced recommendation JSON incident recommending capping the number of active browsing hours per day and an associated rejected recommendation hardware failure JSON incident indicating failure of the fan.

The method for predicting increase in hardware life and decrease in risk of hardware replacement for each recommended remediation user instruction, when implemented at the client information handling system may then end.

FIG. 8 is a flow diagram illustrating a method of tracking user acceptance or rejection of recommendations, including remediation user instructions for pro-actively limiting transitioning to the non-eco-friendly CO2 emissions state three at a client information handling system according to an embodiment of the present disclosure. As described herein, the recommendation agent at each client information handling system may track acceptance or rejection of such recommendations, as well as effects of such acceptance or rejection in the form of ongoing recordation of CO2 state monitoring period JSON incidents to identify hardware failure or future transitions to the non-eco-friendly CO2 emissions state three. These tracked acceptances or rejections, as well as tracked downstream effects thereof may be transmitted back to the protective CO2 emissions minimization system at the UEM platform for crowd-sourced predictions of future effects of similar recommendation acceptances or rejections at other client information handling systems. These predictions may be included within future recommendations displayed to the user of other client information handling systems via graphical user interfaces (GUIs) in order to assist the user in deciding whether to accept or reject reach recommendation provided.

At block 802, the recommendation agent at a client information handling system may receive a recommendation JSON incident from the communication agent at the UEM platform in an embodiment. For example, in an embodiment described with respect to FIG. 2, the recommendation agent 290 may receive one or more recommendation JSON incidents from the communication agent 281 at the UEM platform 200. Such recommendation JSON incidents may include, in an example embodiment, the recommendation JSON incidents described above at block 612 of FIG. 6.

The GUI at the client information handling system in an embodiment may display the remediation user instruction(s) for returning the information handling system to state two or below, and identification of a predicted CO2 emissions state, a hardware component replacement risk value, or a predicted hardware component life extension period at block 804. For example, the GUI 291 at the client information handling system 250 in an embodiment may display such information for the user. More specifically, as described in greater detail with respect to FIG. 3, the GUI 300 may display a plurality of recommendations received from the protective CO2 emissions minimization system in an embodiment within a table in one example embodiment. Each row of the table may list all of the remediation user instructions 302 included within a single recommendation JSON incident received from the protective CO2 emissions minimization system in an embodiment. For example, in an embodiment described at FIG. 6 at block 612 within the first example recommendation JSON incident, the first row of the GUI table 300 may provide the remediation user instruction to cap GPU resources made available to the gaming application, the prediction that such a remediation user instruction will return the client information handling system to state two or pro-actively limit transition to the non-eco-friendly state three, a predicted 10% chance that the remediation user instruction will pro-actively limit replacement of the fan predicted to fail, and a prediction that implementing the remediation user instruction will extend the life of the fan by 100 days. As another example, in an embodiment described at FIG. 6 at block 612 within the second example recommendation JSON incident, the second row of the table 300 may provide the remediation user instruction to install the latest version of the fan driver, the prediction that such a remediation user instruction will return the client information handling system to state two or pro-actively limit transition to the non-eco-friendly state three, a predicted 30% chance that the remediation user instruction will pro-actively limit replacement of the fan predicted to fail, and a prediction that implementing the remediation user instruction will extend the life of the fan by 250 days.

In some cases, a single recommendation JSON incident, and thus a single row of the table 300 may include multiple recommended remediation user instructions. For example, in an embodiment described at FIG. 6 at block 612 within the third example recommendation JSON incident, the third row of the table 300 may provide the remediation user instruction to cap the number of active browsing hours per day and a remediation user instruction to update the operating system to the latest version. The third row in such an embodiment may also include the prediction that execution of both of such remediation user instructions will return the client information handling system to state two or pro-actively limit transition to the non-eco-friendly state three, a predicted 60% chance that implementation of both remediation user instructions will pro-actively limit replacement of the fan predicted to fail, and a prediction that implementing both remediation user instructions will extend the life of the fan by 480 days.

As another example, in an embodiment described at FIG. 6 at block 612 within the third example recommendation JSON incident, the fourth row of the table 300 may provide the remediation user instruction to cap the GPU resources made available to the gaming application, cap the memory resources made available to background applications, cap the network interface device resources made available to the browsing application, install the latest version of the fan driver, and capping the number of active browsing hours per day. The fourth row in such an embodiment may also include the prediction that execution of all such remediation user instructions will return the client information handling system to state one, a predicted 80% chance that implementation of all remediation user instructions will pro-actively limit replacement of the fan predicted to fail, and a prediction that implementing both remediation user instructions will extend the life of the fan by 730 days.

At block 806, the GUI 291 may determine whether the user has selected any of the displayed recommendations. For example, as described in an embodiment with reference to FIG. 3, the user of the client information handling system may select at 310 a "YES" button or a "NO" button for each row of the table, indicating a decision to implement or not implement the recommended remediation user instructions 302 for each such row. If the user has not accepted or selected a remediation user instruction 302, the method may proceed to block 808 for tracking of rejected recommendations. If the user has accepted or selected the remediation user instruction 302, the method may proceed to block 810 for execution of such remediation user instruction 302 and tracking of accepted recommendations.

In an embodiment in which the user has rejected a recommendation via the GUI, the recommendation agent may transmit a recommendation rejection JSON incident identifying the rejected remediation user instruction and the recommendation JSON incident to the communication agent for storage in telemetry at block 808. As described in greater detail above with respect to FIG. 7, by tracking such rejections, the protective CO2 emissions minimization system in an embodiment may be capable of predicting downstream effects of such rejections (e.g., future hardware component failure or transition to non-eco-friendly state) for other client information handling systems experiencing similar increases in CO2 emissions for similar reasons (e.g., failure to update a fan driver). In an example embodiment in which the user has rejected a recommendation JSON incident having an event identification of 987651, which includes a recommendation to update the operating system and to cap the number of active browsing hours per day, the recommendation agent may generate the following recommendation rejection JSON incident:

```
{
  "data" :
  {
    "event_id" : 987649,
    "source_ID" : recommendation_agent,
    "timestamp_unixtime_ms" : 2984657163,
    "client_device_ID" : 456789,
    "client_device_model" : Laptop_7400,
```

-continued

```
        "location" : Paris_France,
        "custom_flags" :
            {
                "reference_recommendation_incident_id" : 987651,
                "User_acceptance" : 0,
            }
    }
}
```

As shown in the above recommendation rejection JSON incident, reference is made to the recommendation incident rejected, which may further reference the predicted failure JSON incident which such recommendation was meant to pro-actively limit. The recommendation rejection JSON incident may further identify the user's response as a rejection by providing a value of zero for the JSON event named "user_acceptance." The recommendation agent may transmit this recommendation rejection JSON incident to the protective CO2 emissions minimization system for storage in telemetry. The method may then proceed to block 814 for transmission of a CO2 state monitoring period JSON incident describing the effects of such a rejection to the UEM platform.

At block 810, the recommendation agent may coordinate with the power analytics module and software application analytics module to execute the remediation user instruction identified within the recommendation JSON incident associated with the user accepted recommendation. For example, the user in an embodiment may have accepted a recommendation having an event ID 987653 which provides a remediation user instruction to cap GPU resources made available to the gaming application at 85% (e.g., as indicated by the JSON event named "gaming_application_GPU_usage," having a value of 0.85). In such an embodiment, the software application analytics module may execute such an instruction to cap the GPU resources made available to the gaming application at 85%. By decreasing the amount of GPU resources made available to the gaming application in such a way, the user of the client information handling system may effectively pro-actively limit the predicted transition to the non-eco-friendly CO2 emissions state three during the current monitoring period, as predicted by the protective CO2 emissions minimization system in an embodiment.

In an embodiment in which the user has accepted a recommendation via the GUI, the recommendation agent may transmit a recommendation acceptance JSON incident identifying the rejected remediation user instruction and the recommendation JSON incident to the communication agent for storage in telemetry at block 812. As described in greater detail above with respect to FIG. 7, by tracking such acceptances, the protective CO2 emissions minimization system in an embodiment may be capable of predicting downstream effects of such acceptances (e.g., effective avoidance of future hardware component failure or transition to non-eco-friendly state) for other client information handling systems experiencing similar increases in CO2 emissions for similar reasons (e.g., failure to update a fan driver). In an example embodiment in which the user has accepted a recommendation JSON incident having an event identification of 987652, which includes a recommendation to update the driver for the fan, the recommendation agent may generate the following recommendation acceptance JSON incident:

```
{
    "data" :
    {
        "event_id" : 987648,
        "source_ID" : recommendation_agent,
        "timestamp_unixtime_ms" : 2984657163,
        "client_device_ID" : 456789,
        "client_device_model" : Laptop_7400,
        "location" : Paris_France,
        "custom_flags" :
            {
                "reference_recommendation_incident_event_id" : 987652,
                "User_acceptance" : 1,
            }
    }
}
```

As shown in the above recommendation acceptance JSON incident, reference is made to the recommendation incident accepted, which may further reference the predicted failure JSON incident which such recommendation was meant to pro-actively limit. The recommendation acceptance JSON incident may further identify the user's response as an acceptance by providing a value of one for the JSON event named "user_acceptance." The recommendation agent may transmit this recommendation acceptance JSON incident to the protective CO2 emissions minimization system for storage in telemetry. The method may then proceed to block 814 for transmission of a CO2 state monitoring period JSON incident describing the effects of such an acceptance and implementation of the recommended remediation user instruction to the UEM platform.

The recommendation agent in an embodiment at block 814 may transmit post-recommendation CO2 state monitoring period JSON incidents to the communication agent at the UEM platform. These post-recommendation CO2 state monitoring period JSON incidents in an embodiment may provide operational telemetry measurements, including those that are user-adjustable, describing CO2 emissions and hardware health after a user has either chosen to accept or reject a recommendation intended to pro-actively limit a transition to the non-eco-friendly CO2 emissions state three at the client information handling system. As described in greater detail above with respect to FIG. 7, the protective CO2 emissions minimization system may use the crowd-sourced recommendation acceptance JSON incidents, recommendation rejection JSON incidents, and post-recommendation CO2 state monitoring period JSON incidents in order to more accurately predict the effects of future recommendations to pro-actively limit transition of other client information handling systems due to similar causes. The method for tracking user acceptance or rejection of recommendations for pro-actively limiting transitioning to the non-eco-friendly CO2 emissions state three may then end.

The blocks of the flow diagrams of FIGS. 4, 5, 6, 7, and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A protective carbon dioxide (CO2) emissions minimization system executing on a unified endpoint management (UEM) platform information handling system comprising:
   a network interface device to receive operational telemetry measurements, including user-adjustable operational telemetry measurements, for a first client information handling system during routine monitoring intervals, including power analytics, software application analytics, event viewer error logs, a determined CO2 emissions value, and a non-eco-friendly state transition threshold value determined for the first client information handling system;
   a hardware processor executing code instructions of the protective CO2 emissions minimization system to predict, via a neural network modeling a relationship between changes in CO2 emissions values over a most recent monitoring period and changes in the user-adjustable operational telemetry measurements over a prior monitoring period immediately preceding the most recent monitoring period, that the user-adjustable operational telemetry measurements over the most recent monitoring period will cause a future determined CO2 emissions value for the first client information handling system determined based on the received operational telemetry measurements recorded during the current routine monitoring interval to exceed the non-eco-friendly state transition threshold value;
   the hardware processor to identify a remediation user instruction predicted, via the neural network, to change operation of the first client information handling system, causing a change in a first user-adjustable operational telemetry measurement to prevent the future determined CO2 emissions value for the first client information handling system from exceeding the non-eco-friendly state transition threshold value; and
   the network interface device to transmit the remediation user instruction for display to a user at the first client information handling system.

2. The information handling system of claim 1, wherein the determined CO2 emissions value is determined for each routine monitoring interval at the first client information handling system based on power consumption and physical location of the first client information handling system, indicating CO2 used in generating power for the first client information handling system.

3. The information handling system of claim 1 further comprising:
   the hardware processor to determine a hardware component replacement risk value associated with the remediation user instruction based on crowd-sourced tracking information for previous user acceptance or previous user rejection of the remediation user instruction; and
   the network interface device to transmit the hardware component replacement risk value for display to the user at the first client information handling system.

4. The information handling system of claim 1 further comprising:
   the processor to determine a hardware component life extension prediction associated with the remediation user instruction based on crowd-sourced tracking information for previous user acceptance or previous user rejection of the remediation user instruction; and
   the network interface device to transmit the hardware component life extension prediction for display to the user at the first client information handling system.

5. The information handling system of claim 1, wherein the non-eco-friendly state transition threshold value is determined for each routine monitoring interval at the first client information handling system based on battery power consumption efficiency loss.

6. The information handling system of claim 1, wherein the non-eco-friendly state transition threshold value is determined for each routine monitoring interval at the first client information handling system based on battery age.

7. The information handling system of claim 1, wherein the non-eco-friendly state transition threshold value is determined for each routine monitoring interval at the first client information handling system based on testing telemetry measurements, including power analytics, software application analytics, event viewer error logs, and a determined CO2 emissions value measured during a preset testing period.

8. A method for protectively minimizing carbon dioxide (CO2) emissions for a first client information handling system comprising:
   receiving, via a network interface device at a Unified Endpoint Management (UEM) platform, operational telemetry measurements, including a user-adjustable operational telemetry measurement for the first client information handling system during routine monitoring intervals, including power analytics, software application analytics, event viewer error logs, a determined CO2 emissions value, and a non-eco-friendly state transition threshold value determined for the first client information handling system;
   predicting, via a hardware processor executing code instructions of a neural network modeling a relationship between changes in CO2 emissions values over a most recent monitoring period and changes in the operational telemetry measurements over a prior monitoring period immediately preceding the most recent monitoring period, that the user-adjustable operational telemetry measurement over the most recent monitoring period will cause a future determined CO2 emissions value for the first client information handling system to exceed the non-eco-friendly state transition threshold value, where the determined CO2 emissions value is determined based on the received operational telemetry measurements recorded during the current routine monitoring interval;

identifying, via the hardware processor, a remediation user instruction predicted, via the neural network, to change operation of the client information handling system, causing a change in the user-adjustable operational telemetry measurement to prevent the future determined CO2 emissions value for the first client information handling system from exceeding the non-eco-friendly state transition threshold value; and transmitting, via the network interface device, the remediation user instruction for display to a user at the first client information handling system.

9. The method of claim 8, wherein the remediation user instruction includes capping access of a software application or of firmware to resources of a memory at the first client information handling system.

10. The method of claim 8, wherein the remediation user instruction includes capping access of a software application or of firmware to resources of the hardware processor at the first client information handling system.

11. The method of claim 8, wherein the remediation user instruction includes capping access of a software application or of firmware to resources of the network interface device at the first client information handling system.

12. The method of claim 8, wherein the remediation user instruction includes updating an Operating System (OS) version executing via a client hardware processor at the first client information handling system.

13. The method of claim 8, wherein the remediation user instruction includes updating a firmware version for a hardware component at the first client information handling system.

14. The method of claim 8, wherein the remediation user instruction includes capping a number of active browsing hours per day at the first client information handling system.

15. A protective carbon dioxide (CO2) emissions minimization system executing on a unified endpoint management (UEM) platform information handling system comprising:

a network interface device to receive operational telemetry measurements, including a user-adjustable telemetry measurement for a first client information handling system during routine monitoring intervals, including power analytics, software application analytics, event viewer error logs, a determined CO2 emissions value, and a non-eco-friendly state transition threshold value determined for the first client information handling system;

a hardware processor executing code instructions of the protective CO2 emissions minimization system to predict, via a neural network modeling a relationship between changes in CO2 emissions values over a most recent monitoring period and changes in the operational telemetry measurements over a prior monitoring period immediately preceding the most recent monitoring period, that the user-adjustable operational telemetry measurement over the most recent monitoring period will cause a future determined CO2 emissions value for the first client information handling system determined based on the received operational telemetry measurements recorded during the current routine monitoring interval to exceed the non-eco-friendly state transition threshold value;

the hardware processor to identify a remediation user instruction predicted, via the neural network, to change operation of the first client information handling system, causing a change in the user-adjustable operational telemetry measurement to prevent the future determined CO2 emissions value for the first client information handling system from exceeding the non-eco-friendly state transition threshold value;

the hardware processor to determine a hardware component replacement risk value associated with the remediation user instruction, indicating a risk that rejecting the remediation user instruction will result in a need to replace a hardware component of the first client information handling system based on crowd-sourced tracking information for previous user acceptance or previous user rejection of the remediation user instruction; and the network interface device to transmit the remediation user instruction and the hardware component replacement risk value for display to a user at the first client information handling system.

16. The information handling system of claim 15, wherein the determined CO2 emissions value is determined for each routine monitoring interval at the first client information handling system based on power consumption and physical location of the first client information handling system, indicating CO2 used to generate power for the first client information handling system.

17. The information handling system of claim 15 further comprising:

the processor to determine a hardware component life extension prediction associated with the remediation user instruction, indicating a predicted time measurement by which a lifetime of a hardware component of the first client information handling system may be extended through execution of the remediation user instruction, based on crowd-sourced tracking information for previous user acceptance or previous user rejection of the remediation user instruction; and the network interface device to transmit the hardware component life extension prediction to the first client information handling system.

18. The information handling system of claim 15, wherein the remediation user instruction includes capping access of a software application or of firmware to resources of a memory at the first client information handling system.

19. The information handling system of claim 15, wherein the remediation user instruction includes capping access of a software application or of firmware to resources of a client hardware processor at the first client information handling system.

20. The information handling system of claim 15, wherein the remediation user instruction includes capping access of a software application or of firmware to resources of a client network interface device at the first client information handling system.

* * * * *